United States Patent
Kyotani et al.

(10) Patent No.: US 9,938,090 B2
(45) Date of Patent: Apr. 10, 2018

(54) CONTAINER RAISING/LOWERING CONVEYANCE APPARATUS

(71) Applicant: Daifuku Co., Ltd., Osaka (JP)

(72) Inventors: Hisashi Kyotani, Shiga (JP); Kazuki Ogawa, Shiga (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 15/355,281

(22) Filed: Nov. 18, 2016

(65) Prior Publication Data

US 2017/0066602 A1 Mar. 9, 2017

Related U.S. Application Data

(63) Continuation of application No. PCT/JP2015/066192, filed on Jun. 4, 2015.

(30) Foreign Application Priority Data

Jun. 13, 2014 (JP) ................................ 2014-122243

(51) Int. Cl.
*B65G 47/90* (2006.01)
*B66C 1/10* (2006.01)
*B65G 1/04* (2006.01)

(52) U.S. Cl.
CPC ............... *B65G 47/90* (2013.01); *B65G 1/04* (2013.01); *B66C 1/10* (2013.01)

(58) Field of Classification Search
CPC ........... B66C 1/101; B66C 1/66; B66C 1/663; B66C 1/10; B65G 47/90; B65G 57/03; B65G 59/02

(Continued)

(56) References Cited

U.S. PATENT DOCUMENTS 5,971,108 A * 10/1999 Yu .......................... B65G 57/03
  187/255
6,695,369 B2 * 2/2004 Schmidt ............... B01J 19/0046
  294/215

(Continued)

FOREIGN PATENT DOCUMENTS

JP         05169387 A  *  7/1993
JP         H06115608 A     4/1994
JP         06190764 A  *  7/1994

*Primary Examiner* — Kaitlin S Joerger
(74) *Attorney, Agent, or Firm* — St. Onge Steward Johnston & Reens LLC

(57) ABSTRACT

A container raising/lowering conveyance apparatus has at least two lifting raising/lowering bodies corresponding respectively to two parallel side surfaces of an article-conveyance container are capable of being raised and lowered, and moved closer to and away from each other. Support units are attached to each of the lifting raising/lowering bodies and pairs of pin-shaped supporting implements in the support units protrude towards the container side at symmetrical positions at both sides of a vertical center line of each of the two parallel side surfaces of the container are arranged and supported at suitable intervals in a vertical direction. Each pin-shaped supporting implement is capable of extending and retracting, and is impelled into and held in a protruded position by a spring. Pairs of pin-shaped supporting implements having a narrow interval therebetween and pairs of pin-shaped supporting implements having a broad interval therebetween are arranged alternately in the vertical direction.

6 Claims, 25 Drawing Sheets

(58) Field of Classification Search
USPC .............................. 294/81.54, 81.62, 67.33
See application file for complete search history.

(56) References Cited

U.S. PATENT DOCUMENTS

| | | | | |
|---|---|---|---|---|
| 7,547,052 | B2* | 6/2009 | Yohe | B65G 47/90 |
| | | | | 294/103.1 |
| 7,828,351 | B2* | 11/2010 | Baumstimler | B25J 15/0052 |
| | | | | 198/468.4 |
| 8,651,543 | B2* | 2/2014 | Matsuoka | B25J 15/0023 |
| | | | | 294/119.1 |
| 9,371,199 | B2* | 6/2016 | Tesauri | B65G 57/24 |
| 2015/0003953 | A1* | 1/2015 | Vail | A63B 57/50 |
| | | | | 414/800 |
| 2016/0001992 | A1* | 1/2016 | Takao | B65G 47/90 |
| | | | | 414/788.4 |
| 2017/0066601 | A1* | 3/2017 | Kyotani | B66C 1/10 |
| 2017/0066602 | A1* | 3/2017 | Kyotani | B66C 1/10 |
| 2017/0066603 | A1* | 3/2017 | Kyotani | B66C 1/10 |
| 2017/0066604 | A1* | 3/2017 | Kyotani | B66C 1/10 |
| 2017/0073199 | A1* | 3/2017 | Kyotani | B66C 1/42 |

* cited by examiner

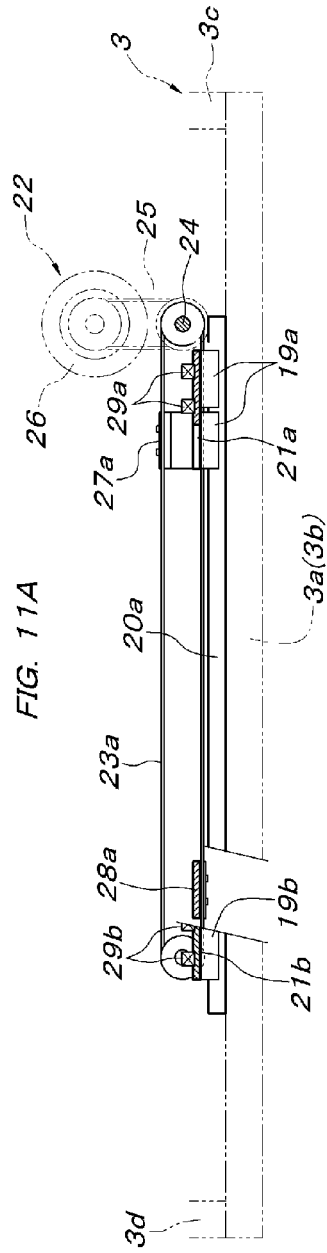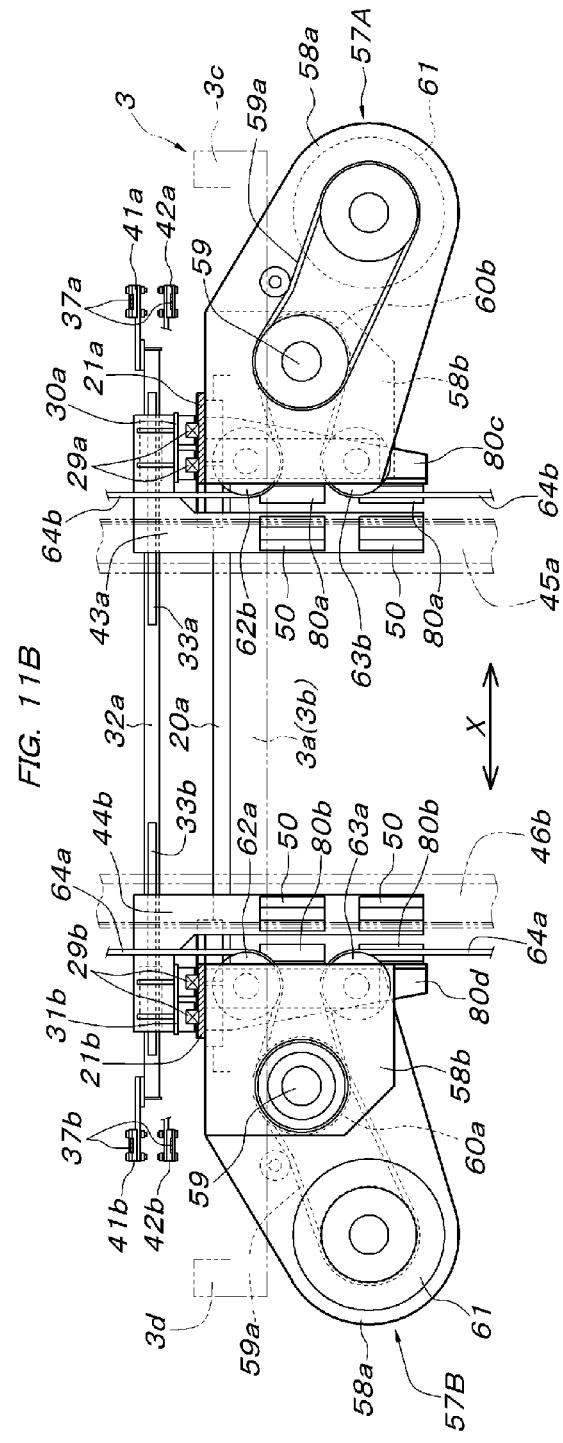

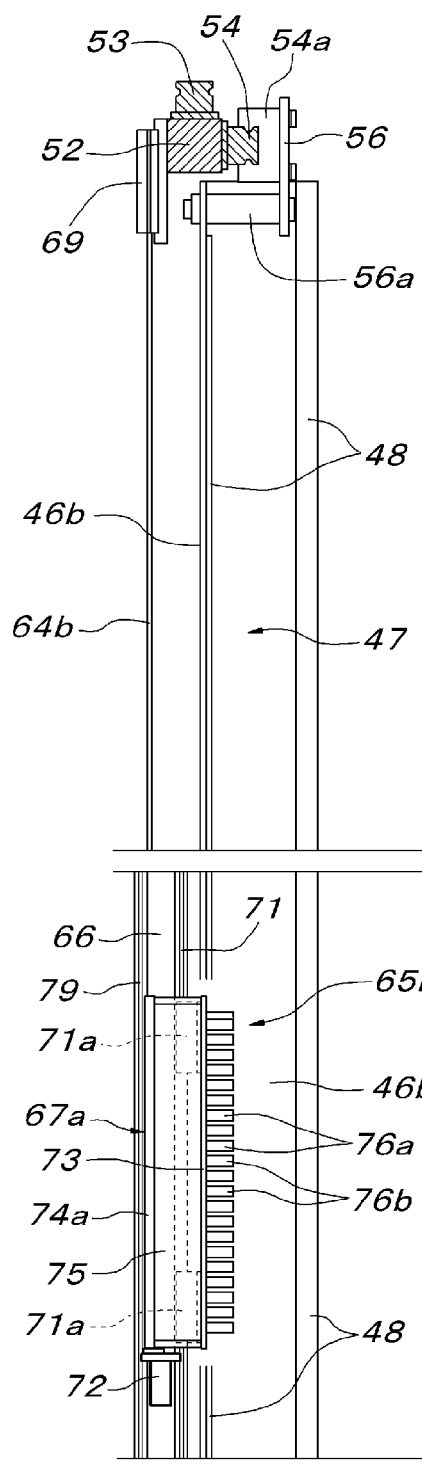
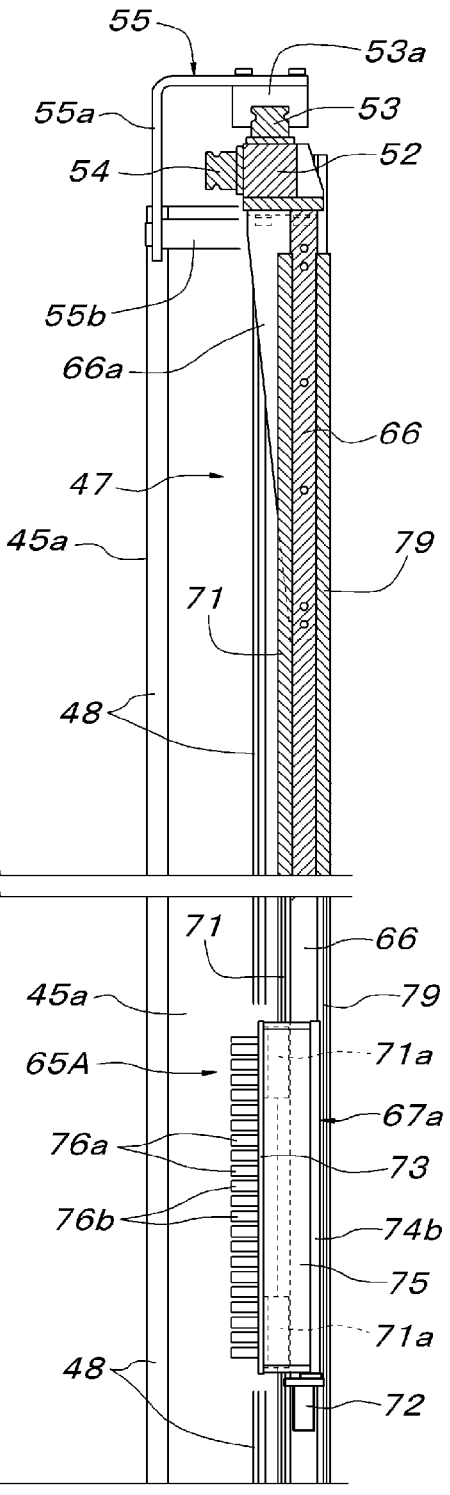
FIG. 21A
FIG. 21B

CONTAINER RAISING/LOWERING CONVEYANCE APPARATUS

FIELD OF INVENTION

The present invention relates to a conveyance apparatus that lifts and conveys a stackable, article-conveyance box-type container with a right-angled parallelogram planar shape.

BACKGROUND OF THE INVENTION

As an example of a conveyance apparatus capable of raising/lowering and conveying a box-type container, there is known, for example, a container raising/lowering conveyance apparatus where, as described in Japanese Published Unexamined Patent Application No. H06-115608 (Patent Literature 1), a raising/lowering body is provided that is suspended from a ceiling traveling crane type traveling body so as to be capable of being raised and lowered and container suspending hooks are provided so as to be capable of opening and closing at a lower side of the raising/lowering body. With this conveyance apparatus, engaged metal fittings, capable of being engaged with and disengaged from the container suspending hooks that are capable of opening/closing, are protruded at a ceiling surface of a container or a gap, with and from which the container suspending hooks can engage and disengage, is secured below a bottom surface of the container.

SUMMARY OF THE INVENTION

With the configuration described in Japanese Published Unexamined Patent Application No. H06-115608 (Patent Literature 1) mentioned above, a prerequisite is that engaged metal fittings specialized for suspension are protruded from a ceiling surface of a container, which is the conveyed object, or a gap is formed below a bottom surface of the container, and a compact plastic container with an open upper side that can be lifted up and carried with both hands cannot be used as it is as the conveyed object. As a matter of course, a generally distributed plastic container has a reinforcing flange portion formed integrally and continuously in parallel to a peripheral direction mainly at an upper end side of its outer side surface as a reinforcing measure, and although a generally distributed compact plastic container such as mentioned above with an open upper side can thus be made an object of conveyance by using the suspending hooks in a manner of hooking onto the flange portion at two parallel side surfaces of the container, frequently with this type of container, those having various heights despite having the same planar size are used mixedly as well and because a height from a floor surface of the flange portion onto which the suspending hooks are to be hooked is thus not fixed, the suspending hook must be controlled with high precision in accordance with a height of a flange portion of the container that is the object of operation and this is not practical.

The present invention proposes a container raising/lowering conveyance apparatus capable of solving the problems of the conventional art such as the above, and to describe by providing reference symbols in parentheses used in the description of embodiments below to facilitate understanding the relationship with the embodiments, the container raising/lowering conveyance apparatus according to the present invention has a configuration where at least two lifting raising/lowering bodies (65A and 65B), corresponding respectively to two parallel side surfaces of an article-conveyance container (C) with a right-angled parallelogram planar shape, are supported by a supporting structure (secondary traveling body (3)) so as to be capable of being raised and lowered and capable of being moved closer to and away from each other, support units (67a), which respectively face the two parallel side surfaces of the container (C), are attached to each of the lifting raising/lowering bodies (65A and 65B), and pairs of pin-shaped supporting implements (76a and 76b) are arranged and supported at suitable intervals in a vertical direction in each of the support units (67a), with each pair protruding towards the container (C) side at symmetrical positions at both sides of a vertical center line of each of the two parallel side surfaces of the container (C), each of the pin-shaped supporting implements (76a and 76b) being capable of extending and retracting and is impelled into and held in a protruded position by a spring (78), and pairs of pin-shaped supporting implements (76a) having a narrow interval therebetween and pairs of pin-shaped supporting implements (76b) having a broad interval therebetween being arranged alternately in the vertical direction.

By using, as the supporting structure, a traveling body capable of traveling through or a movable arm rockable horizontally in a space above a container to be handled, the container raising/lowering conveyance apparatus of the above configuration can be utilized as a container conveyance means capable of moving and lowering a lifted container to and onto another location in accompaniment with operation of the traveling body or the movable arm. Also, a usage method is also possible where the supporting structure is installed over a fixed position, a container conveyed by a conveying traveling body to the fixed position below the supporting structure is lifted once, and the container is then lowered onto another conveying traveling body sent to the fixed position.

With the container raising/lowering conveyance apparatus with the above configuration, in an initial process, the at least two lifting raising/lowering bodies are lowered to positions lateral to the container to be conveyed, and in this process, the lifting raising/lowering bodies are lowered in a state where relative positions in a planar view of the respective lifting raising/lowering bodies and the container to be conveyed are positioned so that a symmetry center line of each pair of the pin-shaped supporting implements that the support units have in a plurality of vertical stages substantially overlaps with the vertical center lines of the container side surfaces. After the lowering, the respective lifting raising/lowering bodies are horizontally moved respectively closer to the two parallel side surfaces of the container to be conveyed and the support units are brought adjacent to flange portions at the container side surfaces. Consequently, among the pin-shaped supporting implements of the plurality of vertical stages that the respective support units have, the pin-shaped supporting implements that are at positions of contacting the flange portion of the container side surfaces are retracted relatively toward the corresponding support unit sides and are retained in states of contacting the flange portion of the container side surfaces against impelling forces of the springs and all of the other pin-shaped supporting implements in protruded states are inserted in spaces above and underneath the flange portion of the side surfaces of the container. By then moving the respective lifting raising/lowering bodies upward in this state, the pairs of pin-shaped supporting implements, which, among the pin-shaped supporting implements of the respective support units, are positioned at the same height directly below the flange portion of the container side surfaces, are made to lift, via the flange portion, the container to be conveyed. When the container to be conveyed is lifted to a prescribed height, the supporting structure supporting the respective lifting raising/lowering bodies is moved as necessary and thereafter, the container to be conveyed can be lowered to a target position by lowering and moving the respective lifting raising/lowering bodies in directions of laterally separating from the container by procedures reverse those described above.

The container to be conveyed can thus be lifted and conveyed, and with the above-described configuration of the present invention, there is no need to control the lowering of each lifting raising/lowering body so that a single pin-shaped supporting implement (pair), which the lifting raising/lowering body has, corresponds to a position directly below a specific flange portion of the container to be conveyed, and it suffices to make a region, which is large in the vertical direction and includes the pin-shaped supporting implements of the plurality of vertical stages of the support unit of the lifting raising/lowering body has, correspond to the flange portion of the container to be conveyed, thus making raising/lowering control of the lifting raising/lowering body extremely easy. Moreover, symmetrical positions at both sides of each of the vertical center lines of at least two parallel side surfaces of the container to be conveyed are respectively supported by the pin-shaped supporting implements to enable the container to be lifted with stability in a horizontal orientation.

Further, with the respective pairs of pin-shaped supporting implements (76a and 76b) of the plurality of vertical stages, the pairs of pin-shaped supporting implements (76a) having the narrow interval therebetween and the pairs of pin-shaped supporting implements (76b) having the broad interval therebetween are arranged alternately, and therefore it is possible to provide a configuration where each of the pairs of pin-shaped supporting implements (76b) having the broad interval therebetween is disposed at a central height of a vertical interval of the pairs of pin-shaped supporting implements (76a) having the narrow interval therebetween in a manner such that the pairs of pin-shaped supporting implements (76b) having the broad interval therebetween and the pairs of pin-shaped supporting implements (76a) having the narrow interval therebetween are overlapped in side view. With such a configuration, a vertical direction pitch at which a flange portion of a container can be supported can be made small while configuring a thickness of each pin-shaped supporting implement to be a thickness that is sufficient in terms of withstand load performance, and a distance by which the lifting raising/lowering bodies are raised until a container to be conveyed is lifted by the pin-shaped supporting implements can thus be made smaller than the thickness of each pin-shaped supporting implement.

In implementing the present invention described above, the respective lifting raising/lowering bodies (65A and 65B) may be provided with vertical rod-shaped main bodies (66) supported by the supporting structure (secondary traveling body (3)) so as to be capable of being raised and lowered, and capable of being moved closer to and away from each other and each support unit (67a) may be configured to be capable of being raised and lowered with respect to the corresponding vertical rod-shaped main body (66) and be supported at a fixed height position of the vertical rod-shaped main body (66). With this configuration, even if, in a case where a container to be conveyed is lowered and stacked on top of another container, a lowering stop position of the lifting raising/lowering bodies becomes somewhat low, the support units are merely put in a state of being hitched via the pin-shaped supporting implements to the flange portion of the lowered container so that a problem of other pin-shaped supporting implements positioned directly above the flange portion of the lowered container pressing down on the flange portion will not occur as in a case where the support units are forcibly lowered integrally with the lifting raising/lowering bodies, and raising/lowering control of the lifting raising/lowering bodies is thus made easy and damaging of the flange portion of the container and the pin-shaped supporting implements can be prevented.

The structure of each support unit including the pin-shaped supporting implements may be of any configuration as long as each pin-shaped supporting implement is supported in a manner enabling extending and retracting, and is impelled into and held in a protruded position by a spring, and in particular, with each of the support units (67a and 67b), a casing (75) thereof, which supports the pin-shaped supporting implements (76a and 76b) in a manner enabling extending and retracting and has the springs (78) installed inside, may have a structure in which the respective pairs of pin-shaped supporting implements (76a and 76b) are distributed and supported at both sides of the corresponding vertical rod-shaped main body (66) and may be configured so that the vertical rod-shaped main body (66), a slide guide rail (71) laid at a container-side surface of the vertical rod-shaped main body (66), and a slide block (71a or 71b) attached to the casing (75) so as to fit with the slide guide rail (71) are inserted in an inner side of the casing (75) in side view. With this configuration, in comparison to a configuration such that an entirety of the support unit protrudes to the container side with respect to the vertical rod-shaped main body, not only can the entirety be configured compactly but a distal portion of each pin-shaped supporting implement that supports the container flange portion is made closer to the vertical rod-shaped main body in side view, enabling load burdens that act on each pin-shaped supporting implement, support unit casing, etc., to be reduced.

Also, each lifting raising/lowering body (65A or 65B) may be made to support a plurality of support units (67a and 67b) across a suitable interval in the vertical direction. With this configuration, even when a large number of containers to be conveyed are stacked, both a container at a lowest end adjacent to a support unit at a lower side and a container at an intermediate height or a highest end adjacent to a support unit at a higher side can be supported respectively and separately from among an entirety of the stacked containers to enable the entirety of stacked containers to be lifted and conveyed safely with good stability. Also, a maximum load applied to the pin-shaped supporting implements of the support units can be suppressed to enable the support units, including the pin-shaped supporting implements, to be implemented with light weight and low cost.

BRIEF DESCRIPTION OF THE DRAWINGS

FIG. 11A is a partially cutaway front view showing an X-direction drive means driving the main movable bases, and FIG. 11B is a front view showing raising/lowering drive means provided at the main movable bases.

FIG. 21A is a partial longitudinal sectional front view showing a single lifting raising/lowering body and a single gripping raising/lowering body at the same side, and FIG. 21B is a partial longitudinal sectional front view showing another single lifting raising/lowering body and a single gripping raising/lowering body at the same side.

DETAILED DESCRIPTION OF THE INVENTION

Figure 1:
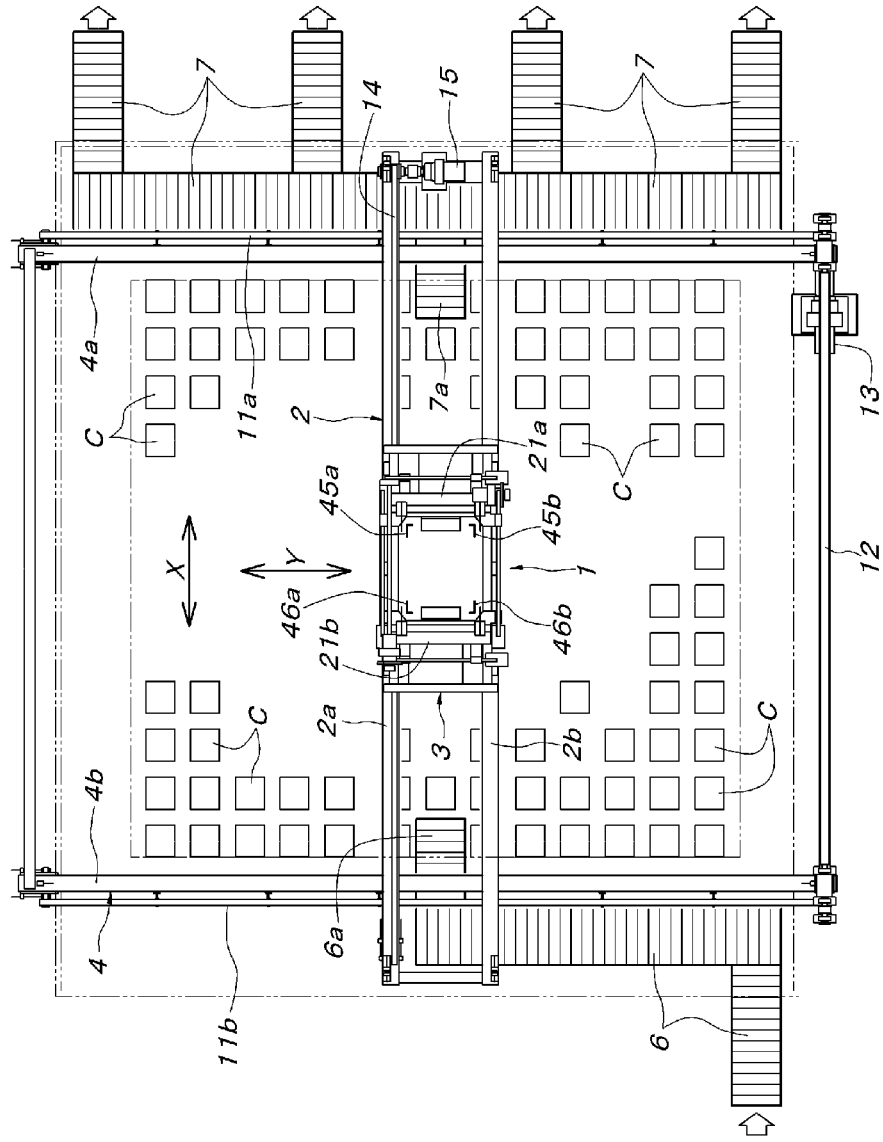
FIG. 1 is a plan view showing a storage facility.
Figure 2:
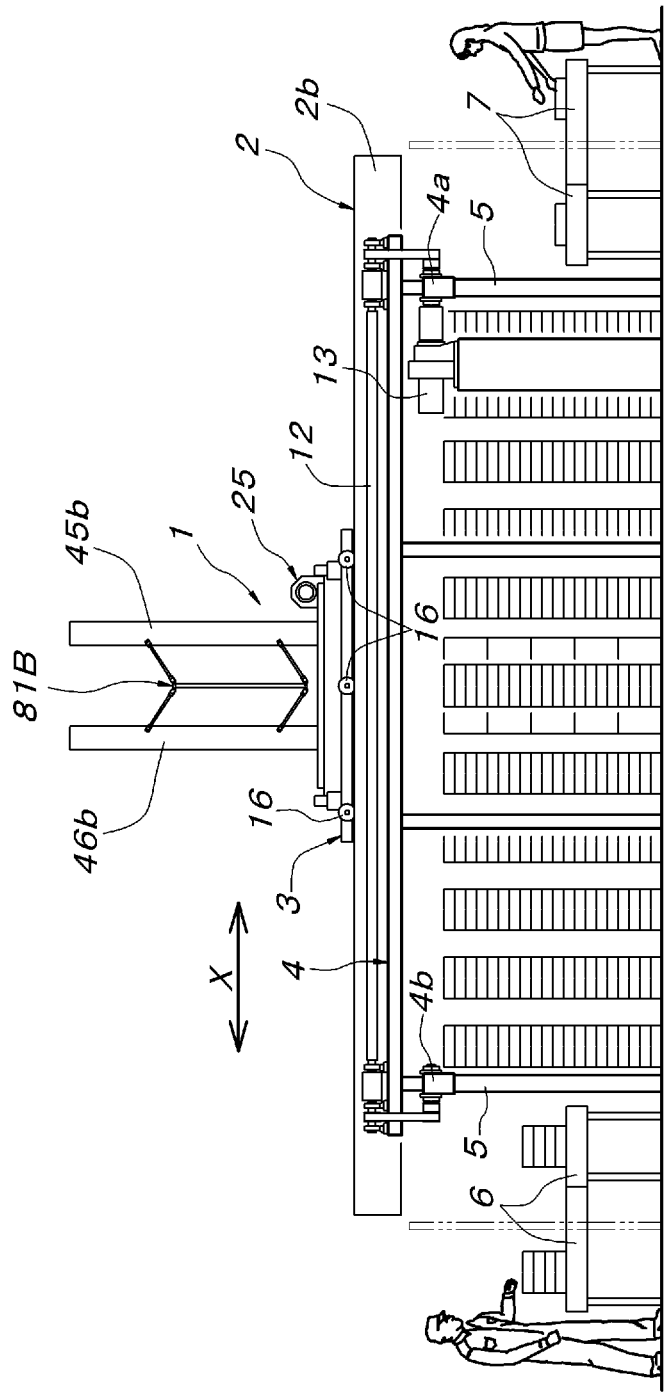
FIG. 2 is a front view of the same storage facility.
Figure 3:
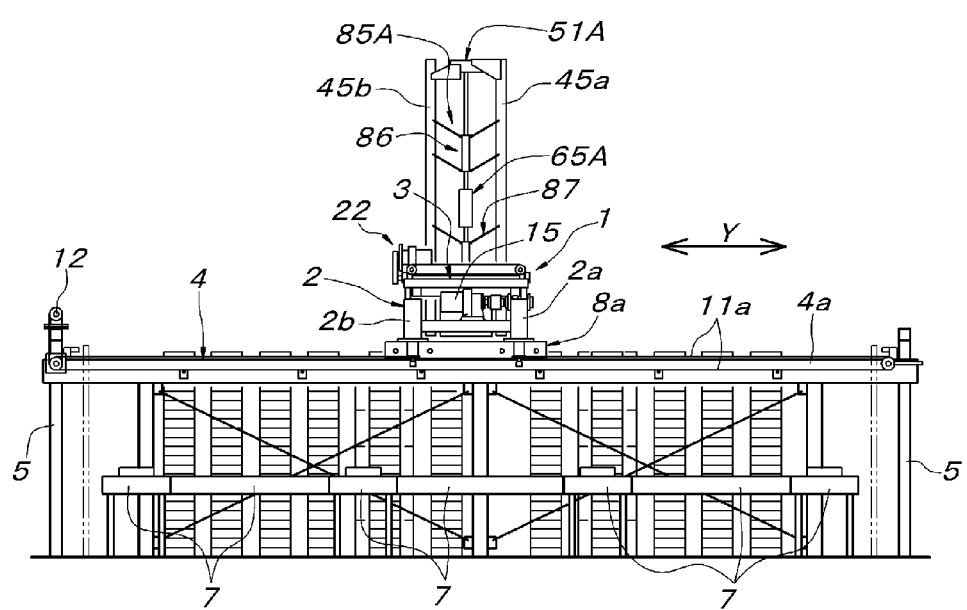
FIG. 3 is a side view of the same storage facility.

In FIG. 1 to FIG. 3, 1 is a ceiling traveling crane type conveyance apparatus and is installed at an upper side of a storage area configured with a flat floor surface with a right-angled parallelogram planar shape. The conveyance apparatus 1 includes a main traveling body 2 capable of traveling in a Y direction (front/rear depth direction) on a horizontal plane and a secondary traveling body 3 supported above the main traveling body 2 in a manner enabling travel in a horizontally oriented X direction (right/left width direction) at a right angle to the travel direction of the main traveling body 2. A rectangular frame structure 4, surrounding the storage area, is horizontally installed over the storage area at a fixed height above the floor surface via column members 5, and respective end portions of the main traveling body 2 are supported, in a manner enabling traveling in the Y direction, on a set of beam members 4a and 4b of the rectangular frame structure 4 that are parallel to the Y direction. The main traveling body 2 has a pair of side frames 2a and 2b, with a length spanning an entire length in the X direction, aligned in parallel across a suitable interval in its travel direction (Y direction), and respective side edges of the secondary traveling body 3 are supported, in a manner enabling traveling in the X direction, on the respective side frames 2a and 2b.

A storage conveyor 6 and a retrieval conveyor 7 are juxtaposed to the storage area. Transferring end portions 6a and 7a at the storage area sides of the respective conveyors 6 and 7 enter inside the storage area, and by Y-direction traveling of the main traveling body 2 on the beam members 4a and 4b of the rectangular frame structure 4 and X-direction traveling of the secondary traveling body 3 on the side frames 2a and 2b of the main traveling body 2, the secondary traveling body 3 can be positioned directly above any position of an entire area inside the storage area surrounded by the rectangular frame structure 4, including the transferring end portions 6a and 7a of the storage and retrieval conveyors 6 and 7.

Figure 4:
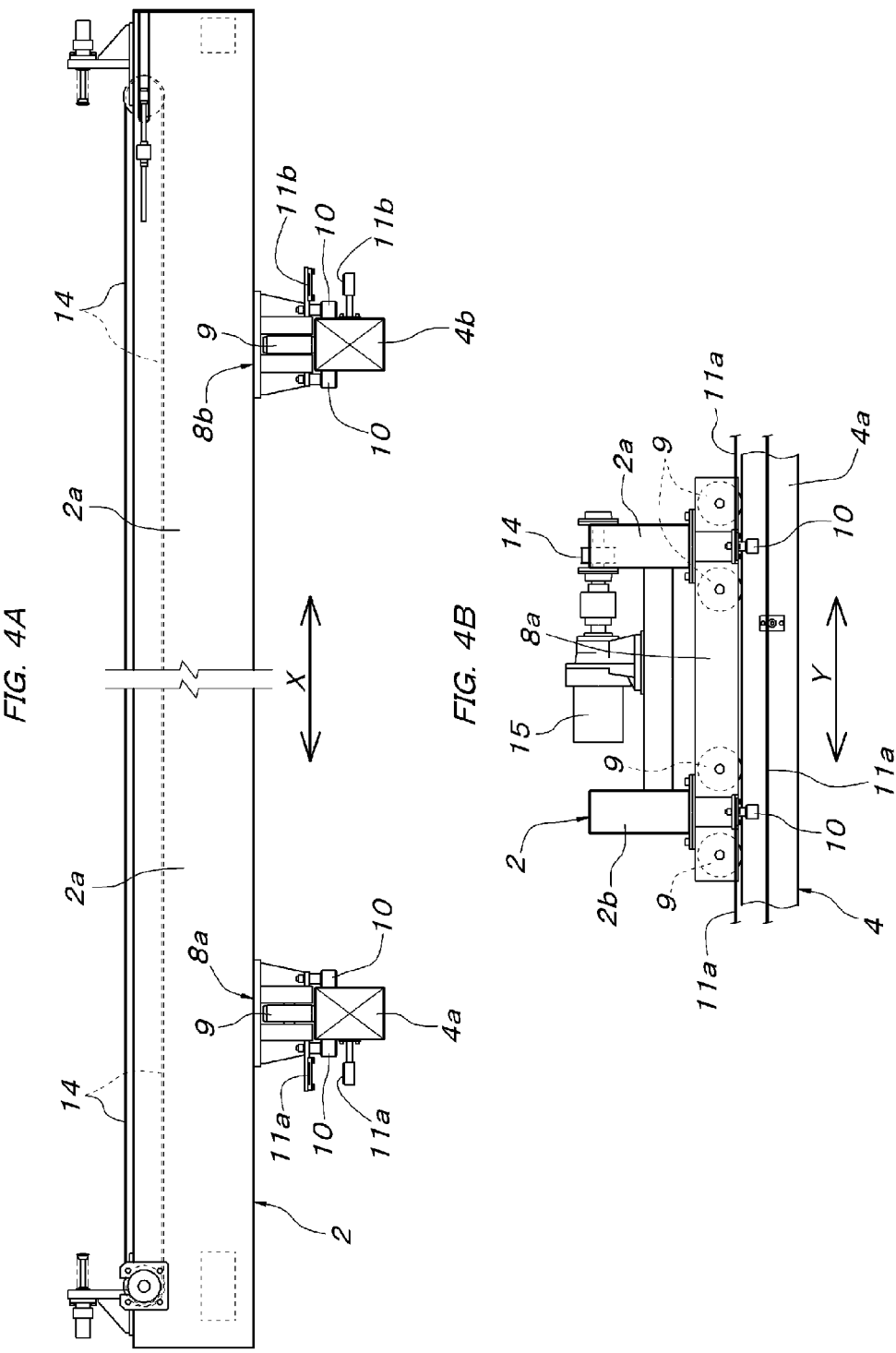
FIG. 4A is a partially cutaway rear view showing main movable bases on the secondary traveling body.
FIG. 4B is a side view thereof.
Figure 5:
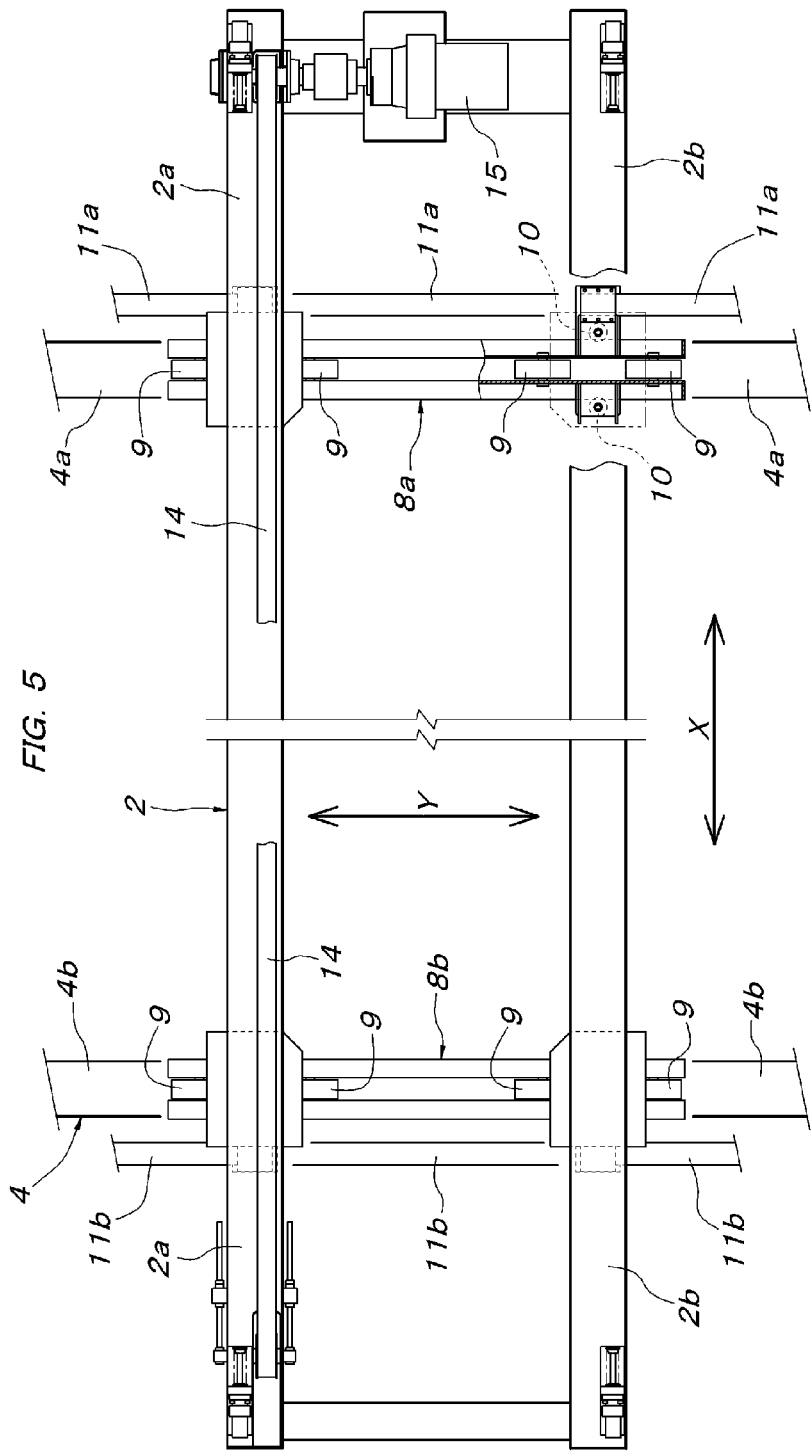
FIG. 5 is a partially cutaway plan view showing the main traveling body.

As shown in FIG. 4 and FIG. 5, the main travel body 2 has carriage portions 8a and 8b supported on the beam members 4a and 4b in a manner enabling movement in a length direction of the beam members 4a and 4b, the pair of side frames 2a and 2b are supported on the carriage portions 8a and 8b, and each of the carriage portions 8a and 8b is provided with a plurality of wheels 9 that roll on the corresponding beam member 4a or 4b and positioning rollers 10 sandwiching the beam member 4a or 4b from both right and left sides. At the respective beam members 4a and 4b, timing belts 11a and 11b are stretched in a manner enabling rotation along the beam members 4a and 4b, each of the timing belts 11a and 11b has both ends thereof fastened to the corresponding carriage portion 8a or 8b, and with each of the timing belts 11a and 11b, one of pulleys that stretch it is interlockingly coupled to a single motor 13 via a transmission shaft 12 to provide a configuration where both timing belts 11a and 11b are driven to rotate in synchronization by the motor 13 to move the main traveling body 2 reciprocally in parallel to the Y direction.

Figure 6:
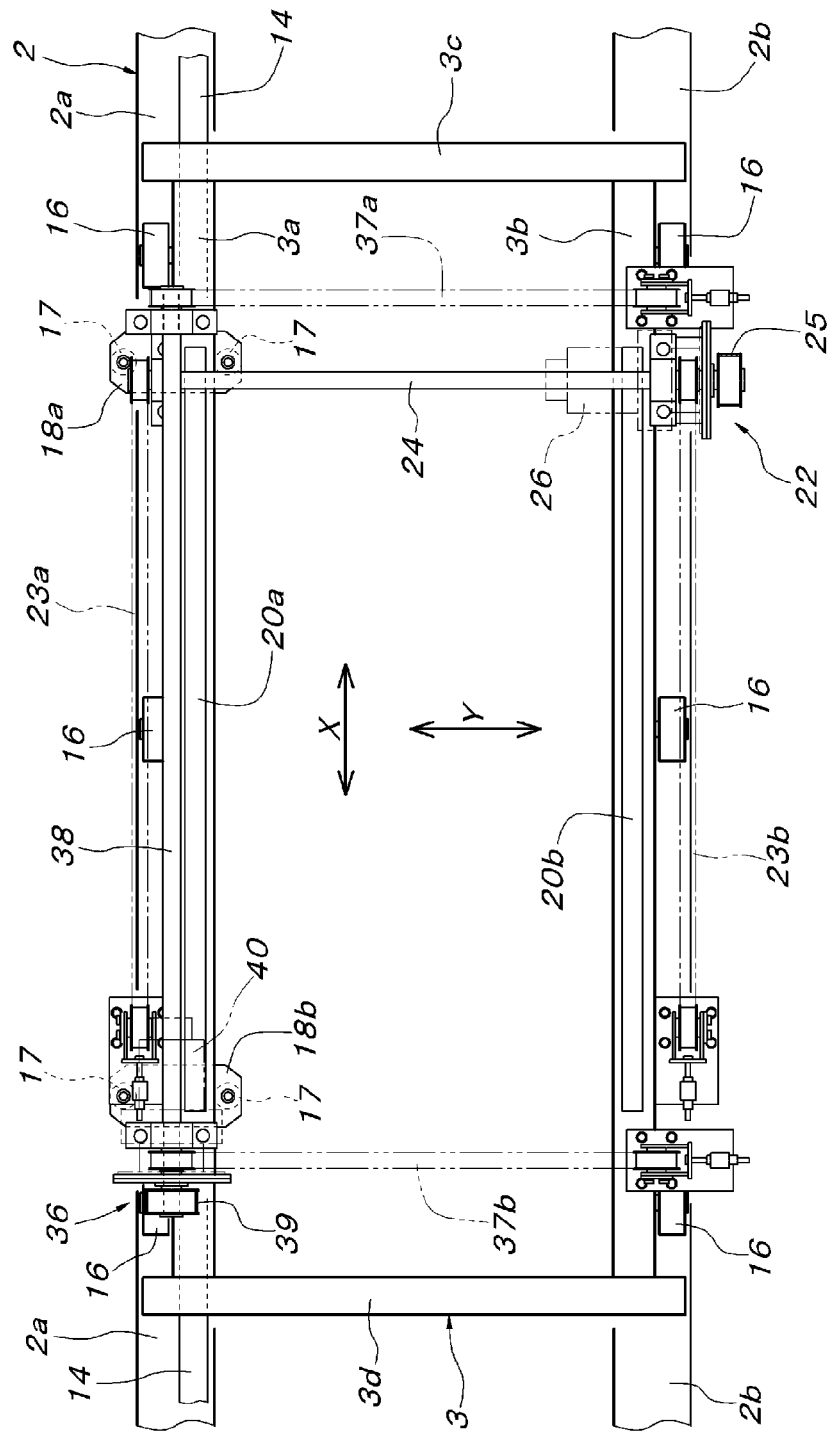
FIG. 6 is a plan view showing the secondary traveling body on the main traveling body.
Figure 7:
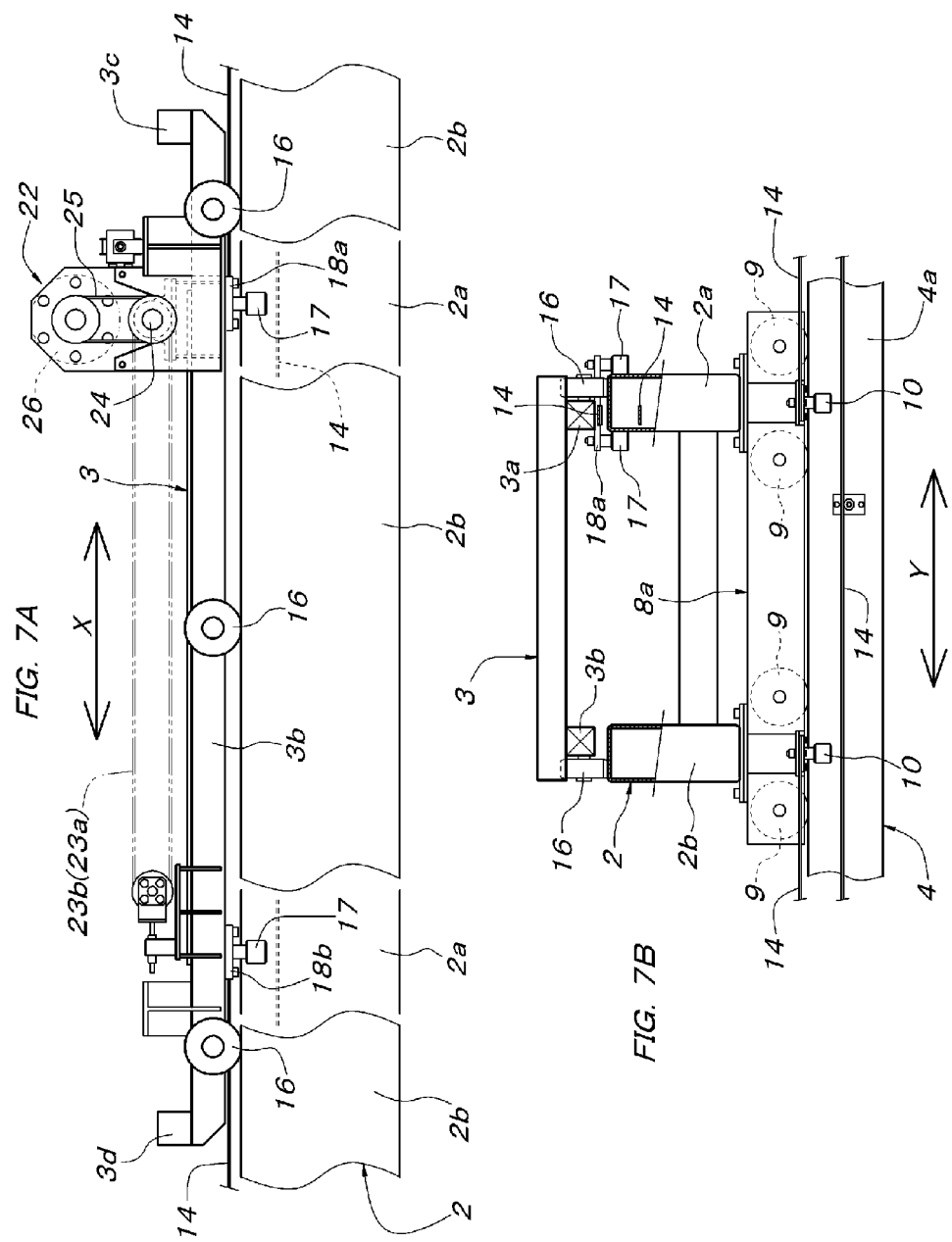
FIG. 7A is a front view showing the secondary traveling body.
FIG. 7B is a partial longitudinal sectional view showing the same secondary traveling body.

At the side frame 2a at one side of the main traveling body 2, a timing belt 14 is stretched in a manner enabling rotation along the side frame 2a and a motor 15 that drives the timing belt 14 to rotate is juxtaposed. As shown in FIG. 6 and FIG. 7, the secondary travel body 3 is configured from a pair of side frames 3a and 3b, disposed in parallel to the side frames 2a and 2b of the main traveling body 2 at an upper side of the side frames 2a and 2b, and a pair of coupling frames 3c and 3d, coupling and integrating both side frames 3a and 3b to each other, a plurality of wheels 16, rolling on the side frames 2a and 2b of the main traveling body 2, are pivotally supported at the side frames 3a and 3b, and bearing plates 18a and 18b, each pivotally supporting a pair of rollers 17 that sandwich the side frame 2a of the main traveling body 2, are attached at positions near respective ends of the side frame 3a at one side. Respective ends of the timing belts 14 are fastened to the bearing plates 18a and 18b and by driving the timing belt 14 to rotate by means of the motor 15, the secondary traveling body 3 can be moved reciprocally in the X direction.

With the above configuration, by a combination of putting the motor 13 in operation to move the main traveling body 2 in the Y direction and putting the motor 15, on the main traveling body 2, in operation to move the secondary traveling body 3 in the X direction on the main traveling body 2, the secondary traveling body 3 can be positioned directly above any position of the storage area of rectangular planar shape surrounded by the rectangular frame structure 4.

Figure 8:
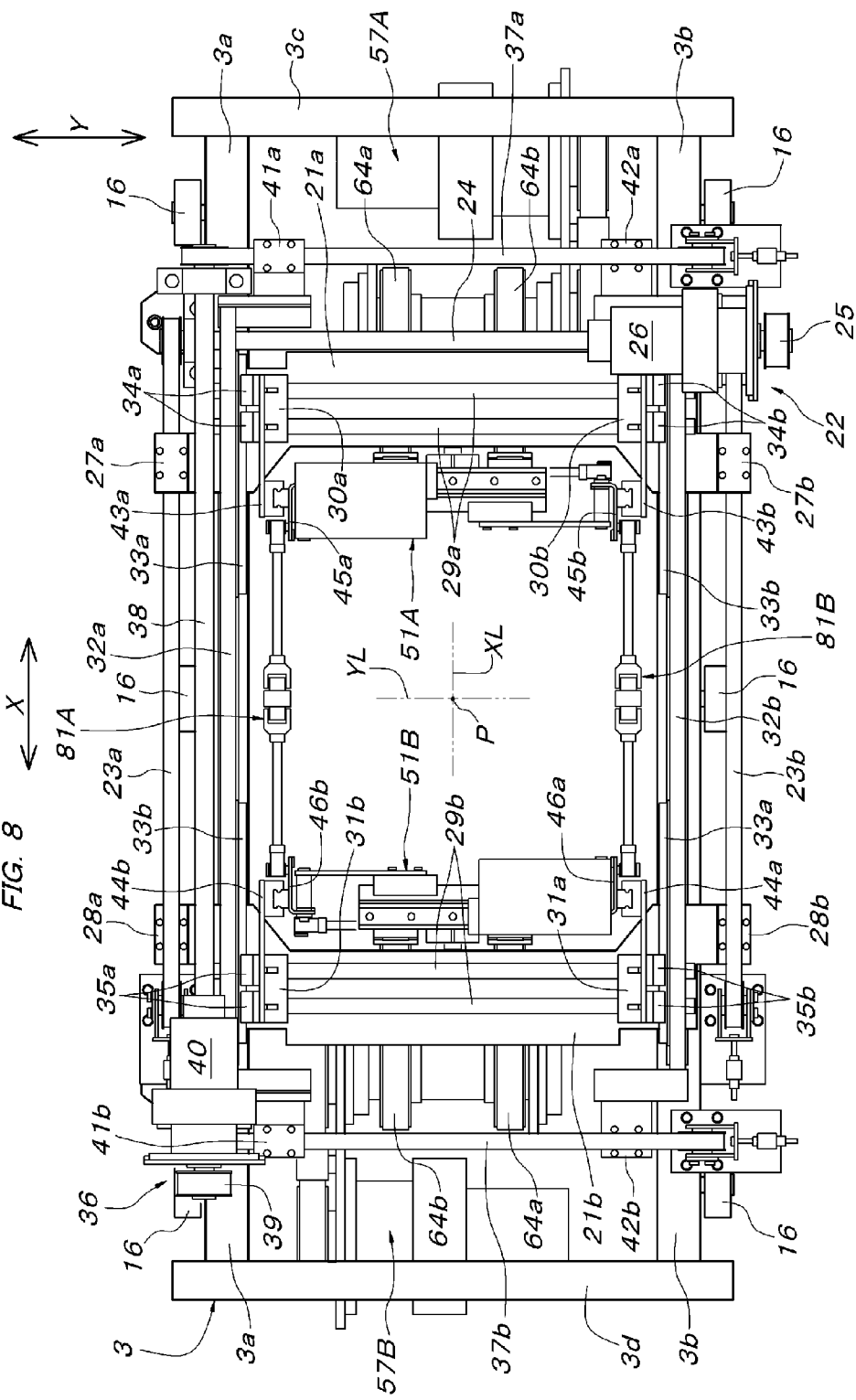
FIG. 8 is a plan view showing a detailed structure on the secondary traveling body.
Figure 9:
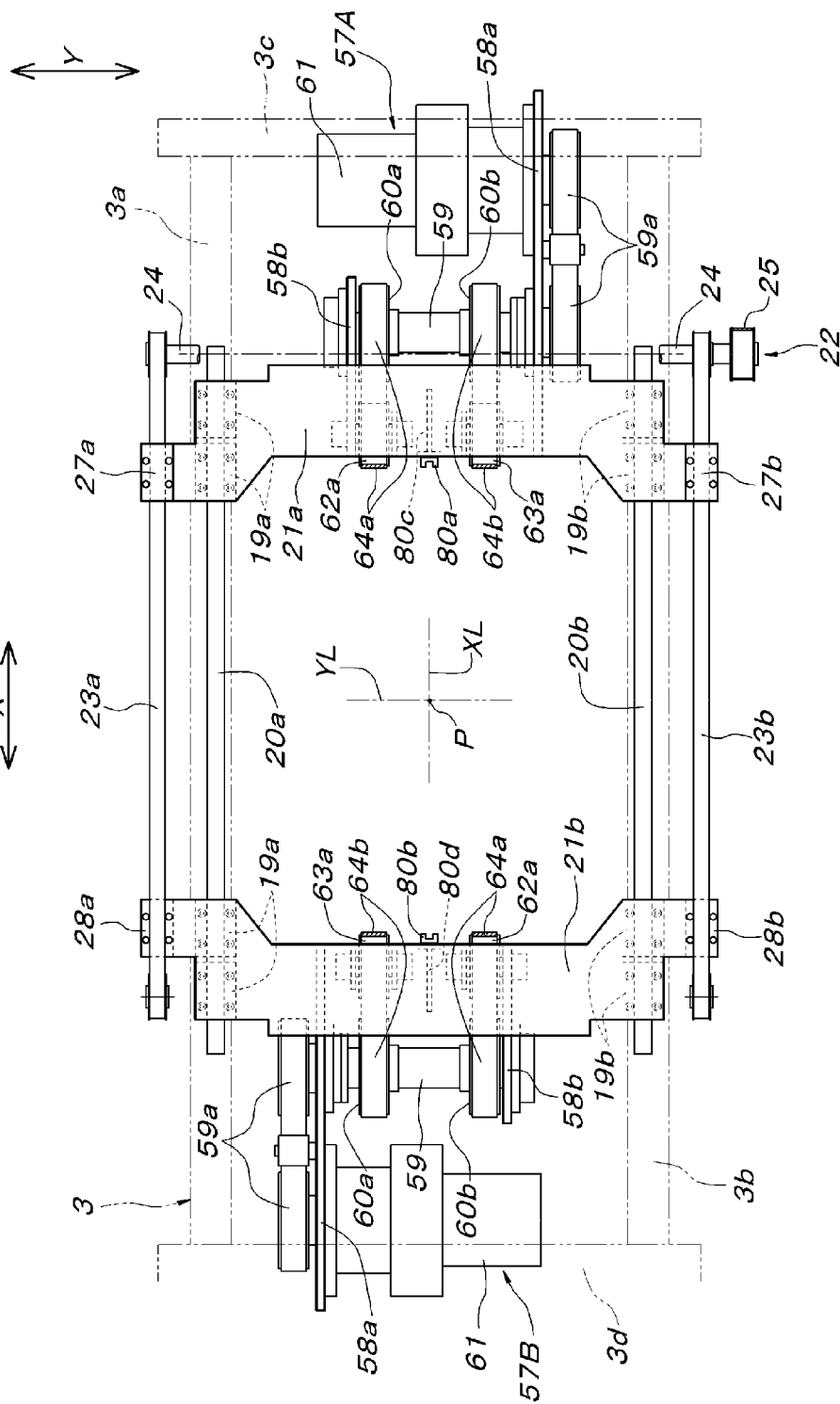
FIG. 9 is a plan view showing an X-direction pair of main movable bases supported on the secondary traveling body.
Figure 10:
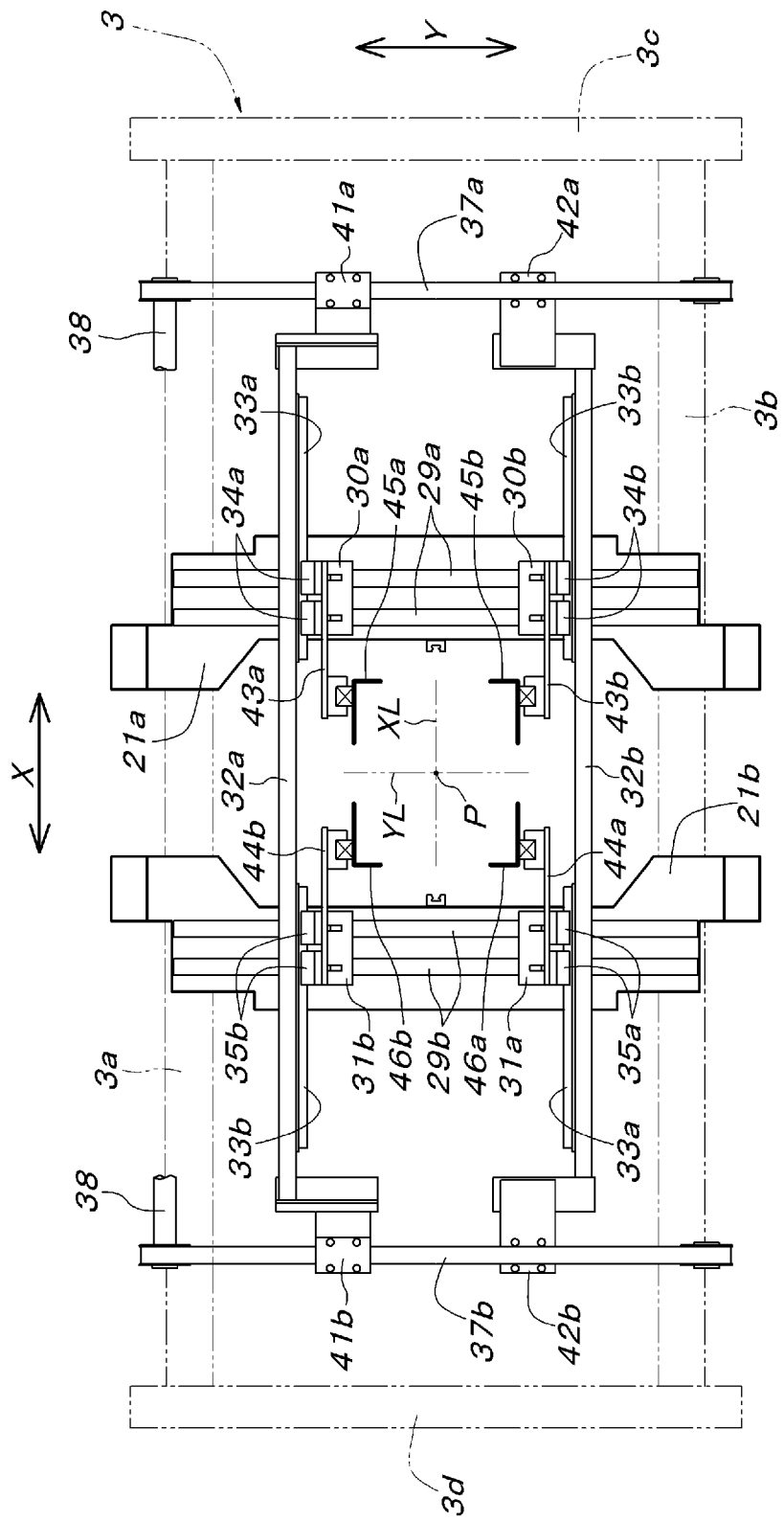
FIG. 10 is a plan view showing the X-direction pair of main movable bases with a Y-direction pair of secondary movable bases supported on each of the main movable bases.

As shown in FIG. 8 to FIG. 10, the secondary traveling body 3 has a pair of main movable bases 21a and 21b, made capable of moving closer to and away from each other in the X direction, installed via guide rails 20a and 20b attached on the side frames 3a and 3b and slide blocks 19a and 19b fitted to the guide rails 20a and 20b and has juxtaposed thereto an X-direction drive means 22 for moving the pair of main movable bases 21a and 21b closer to and away from each other in synchronization in the X direction. The X-direction drive means 22 is configured from a pair of timing belts 23a and 23b, stretched at outer sides of the side frames 3a and 3b of the secondary traveling body 3 in a manner enabling rotation along the side frames 3a and 3b, and a motor 26, interlockingly coupled to both timing belts 23a and 23b via a transmission shaft 24 and a belt transmission means 25 and installed on the secondary traveling body 3, and upper-side path portions of the respective timing belts 23a and 23b are coupled via coupling members 27a and 27b to respective ends of one main movable base 21a and lower-side path portions of the respective timing belts 23a and 23b are coupled via coupling members 28a and 28b to respective ends of the other main movable base 21b. With the thus configured X-direction drive means 22, the pair of main movable bases 21a and 21b can be moved closer to each other by driving both timing belts 23a and 23b to rotate forward by the motor 26 and the pair of main movable bases 21a and 21b can be moved away from each other by driving both timing belts 23a and 23b to rotate in reverse by the motor 26.

Figure 12:
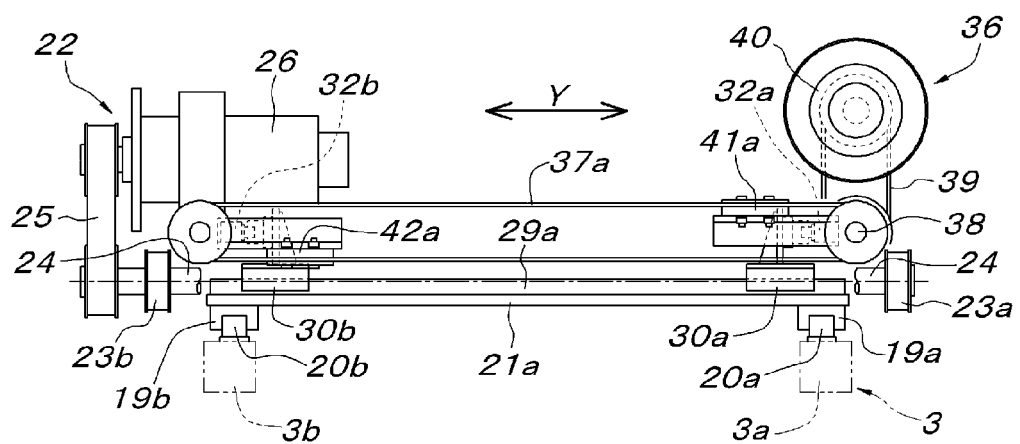
FIG. 12 is a side view showing a Y-direction drive means driving the secondary movable bases.
Figure 13:
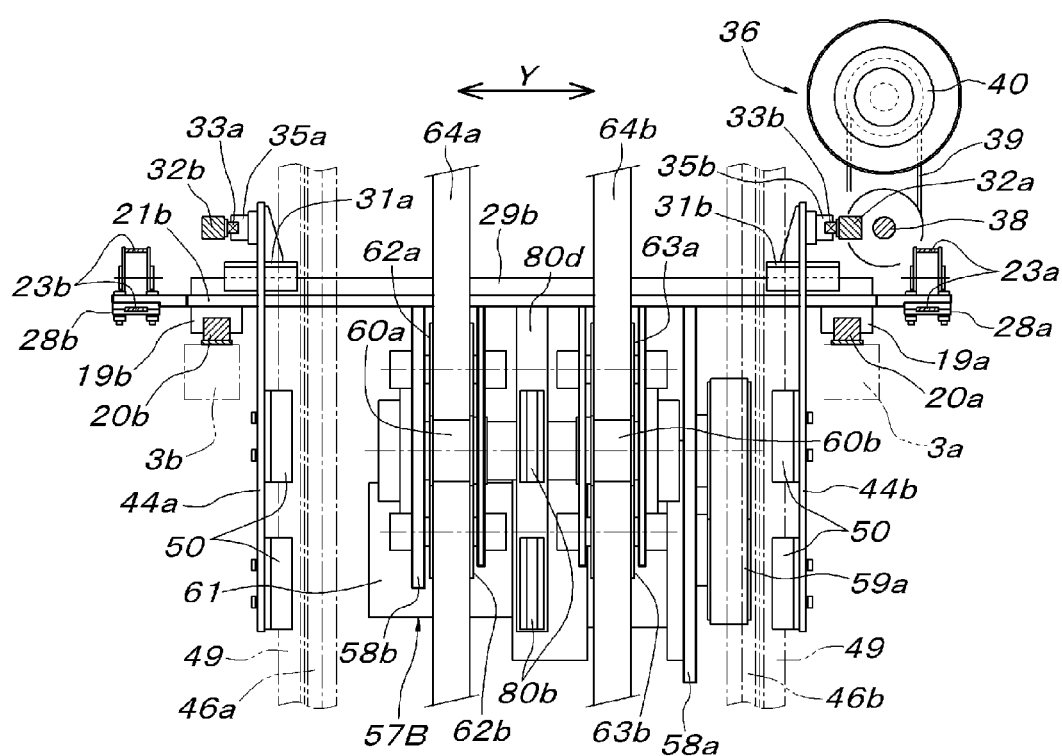
FIG. 13 is a side view showing the secondary movable bases and the raising/lowering drive means supported at the main movable base at one side.

As shown in FIG. 10 to FIG. 12, on each of the pair of main movable bases 21a and 21b, a pair of secondary movable bases 30a and 30b or 31a and 31b, which are movable in the Y direction, are provided via a guide rail 29a or 29b laid in parallel to the Y direction on the main movable base 21a or 21b. Among the secondary movable bases 30a to 31b, the X-direction pair of secondary movable bases 30a and 31b that are positioned at the same side in the Y direction are supported in a manner enabling movement in the X direction on an interlocking rod-shaped body 32a, disposed in parallel to the X direction at an outer side of the secondary movable bases 30a and 31b, via guide rail 33a, laid at the interlocking rod-shaped body 32a, and slide blocks 34a and 35a fitted to the guide rail 33a, and the other X-direction pair of secondary movable bases 30b and 31a are supported in a manner enabling movement in the X direction on an interlocking rod-shaped body 32b, disposed in parallel to the X direction at an outer side of the secondary movable bases 30b and 31a, via guide rail 33b, laid at the interlocking rod-shaped body 32b, and slide blocks 34b and 35b fitted to the guide rail 33b.

The pair of interlocking rod-shaped bodies 32a and 32b are moved closer to and away from each other in the Y direction by a Y-direction drive means 36. The Y-direction drive means 36 is configured from a pair of timing belts 37a and 37b, stretched in parallel to the secondary traveling body 3 and the Y direction at outer sides of the pair of interlocking rod-shaped bodies 32a and 32b, and a motor 40 driving both timing belts 37a and 37b to rotate via a transmission shaft 38 and a belt transmission means 39 and installed on the secondary traveling body 3. Upper-side path portions of the timing belts 37a and 37b are coupled via coupling members 41a and 41b to respective ends of one coupling rod-shaped body 32a and lower-side path portions of the respective timing belts 37a and 37b are coupled via coupling members 42a and 42b to respective ends of the other interlocking rod-shaped body 32b. With the thus configured Y-direction drive means 36, the pair of interlocking rod-shaped bodies 32a and 32b can be moved closer to each other in the Y direction by driving both timing belts 37a and 37b to rotate forward by the motor 40 and the pair of interlocking rod-shaped bodies 32a and 32b can be moved away from each other in the Y direction by driving both timing belts 37a and 37b to rotate in reverse by the motor 40. When the pair of interlocking rod-shaped bodies 32a and 32b move closer to each other, the Y-direction pair of secondary movable bases 30a and 30b supported on the main movable base 21a move closer to each other and, at the same time, the Y-direction pair of secondary movable bases 31a and 31b supported on the main movable base 21b move closer to each other. Oppositely, when the pair of interlocking rod-shaped bodies 32a and 32b move away from each other, the Y-direction pair of secondary movable bases 30a and 30b supported on the main movable base 21a move away from each other and, at the same time, the Y-direction pair of secondary movable bases 31a and 31b supported on the main movable base 21b move away from each other. In either case, an interval between the X-direction pair of secondary movable bases 30a and 31b that are interlocked with the interlocking rod-shaped body 32a and an interval between the X-direction pair of secondary movable bases 30b and 31a that are interlocked with the interlocking rod-shaped body 32b are respectively maintained in a state of being equal to an interval between the main movable bases 21a and 21b.

Figure 23:
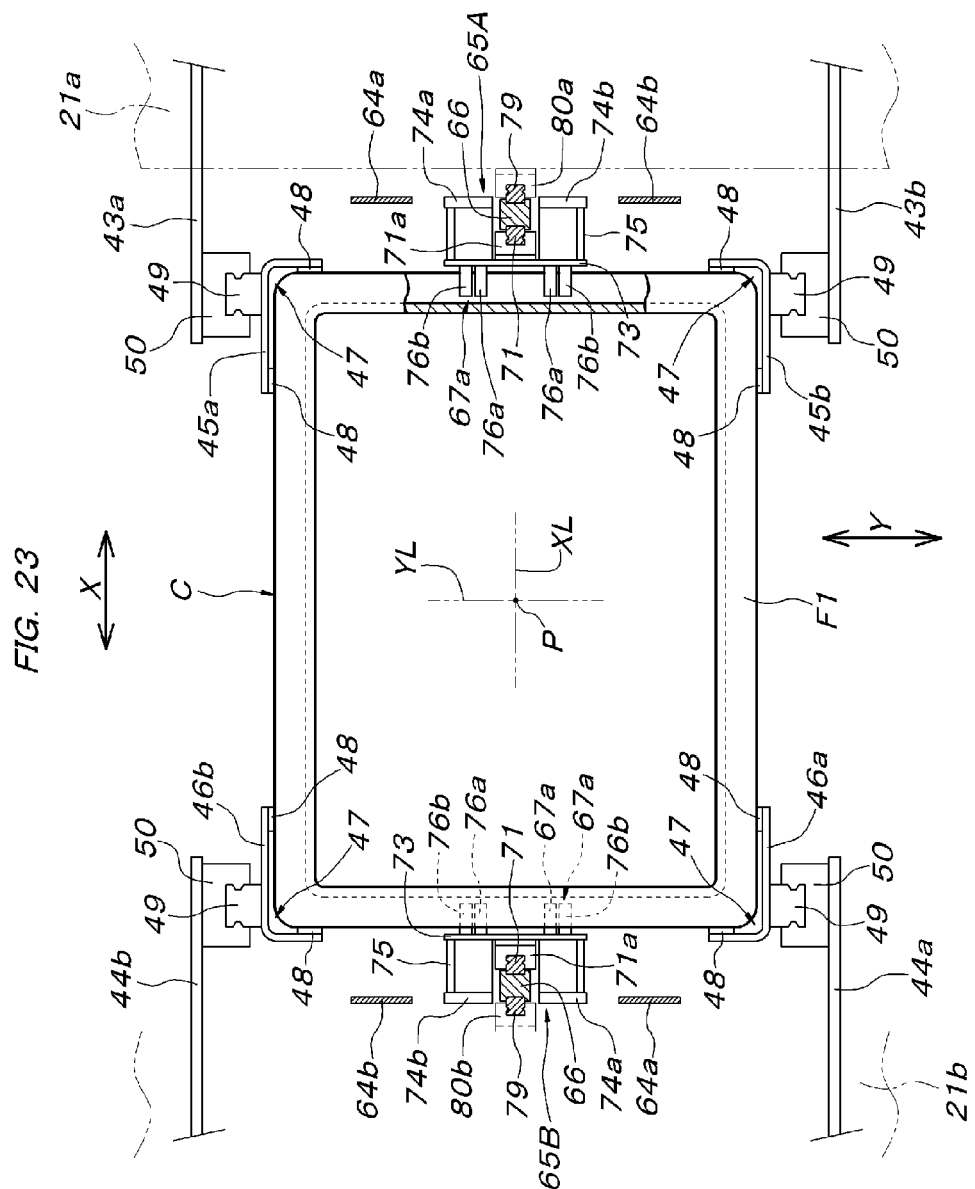
FIG. 23 is a partial transverse sectional plan view showing a state where a container is gripped and raised/lowered by the four gripping raising/lowering bodies and the X-direction pair of lifting raising/lowering bodies.

As shown in FIG. 10 and FIG. 11B, supporting members 43a, 43b, 44a, and 44b of inverted-L-shapes extending downward at X-direction inner sides are respectively mounted to the four secondary movable bases 30a, 30b, 31a, and 31b, and gripping raising/lowering bodies 45a to 46b are respectively mounted to inner sides of vertical portions of the respective supporting members 43a to 44b. Each of the gripping raising/lowering bodies 45a to 46b is constituted of a rod-shaped member that is long in a vertical direction and includes a fitting portion 47 having an angle-shaped transverse section over an entire vertical direction length. As shown in FIG. 23, the fitting portions 47 are disposed in orientations enabling fitting respectively to four corners of a container C to be conveyed, and have anti-slip strip bodies 48 attached, so as to extend continuously over the entire length, to outer side edges of right-angled inner side surfaces facing the container C. For each of the gripping raising/lowering bodies 45a to 46b, a raising/lowering guide rail 49, which is continuous over an entire length, is attached to an outer side of an X-direction plate portion parallel to the X direction, and slide blocks 50, fitted to the raising/lowering guide rails 49 and supporting the respective gripping raising/lowering bodies 45a to 46b so as to be capable of being raised and lowered, are attached to the inner sides of the vertical portions of the respective supporting members 43a to 44b.

Figure 14:
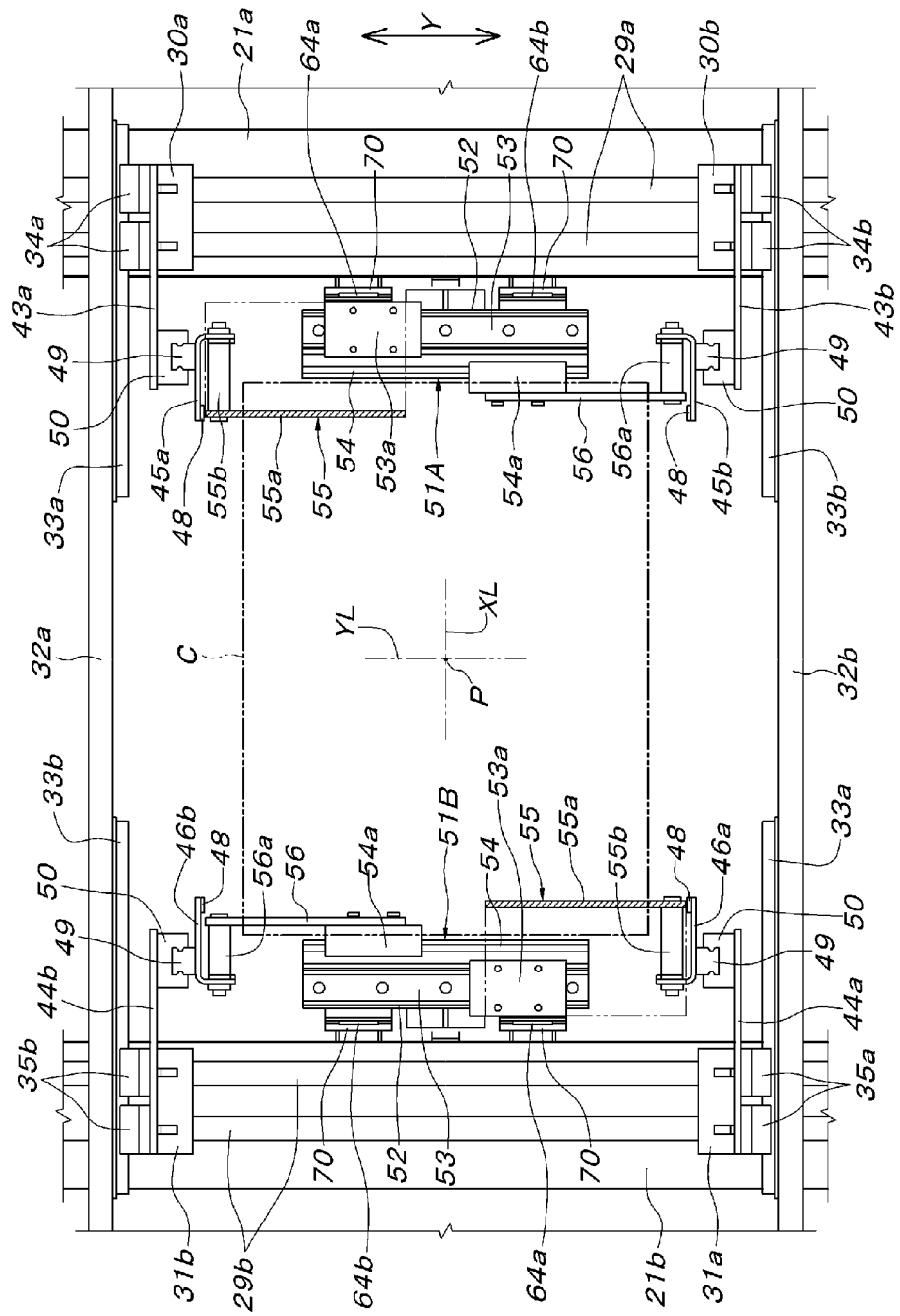
FIG. 14 is a plan view showing a support structure of four gripping raising/lowering bodies.
Figure 18:
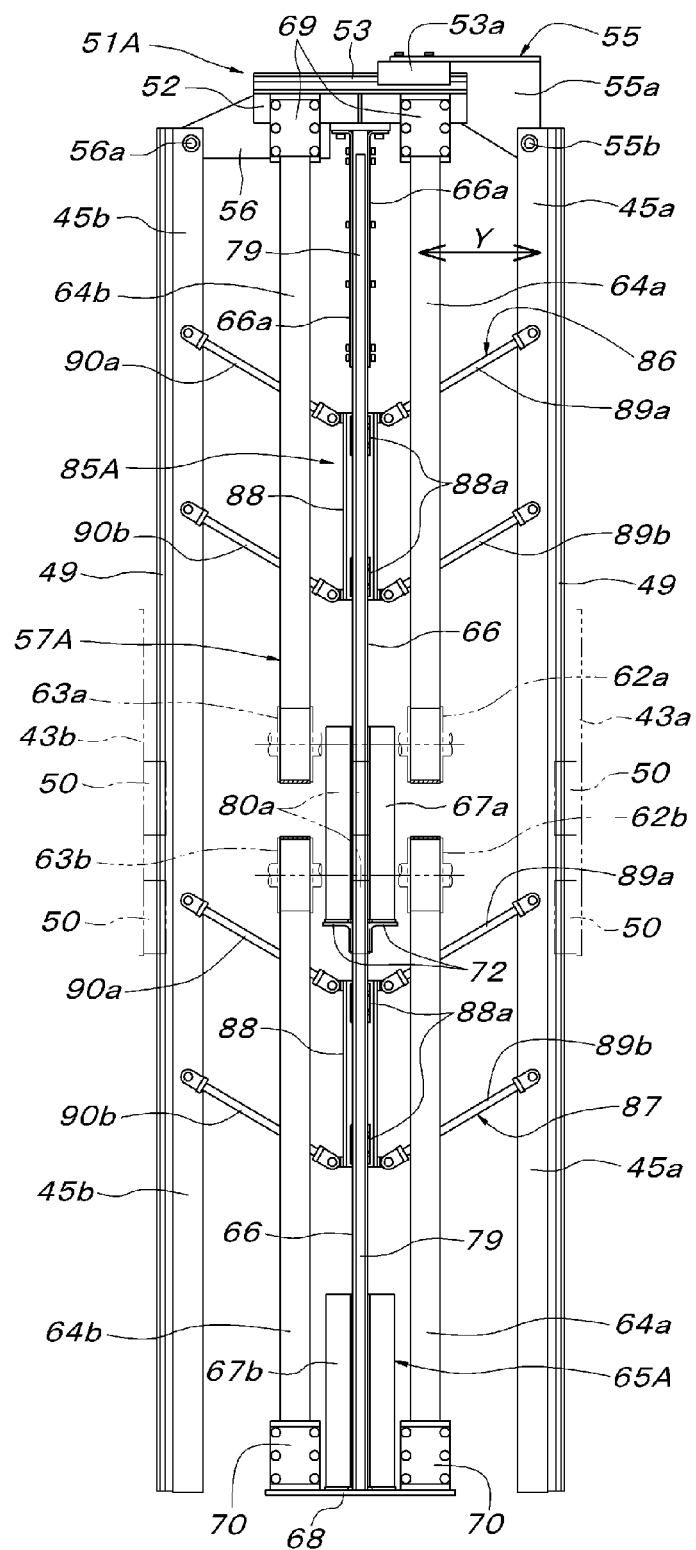
FIG. 18 is a side view showing a Y-direction pair of gripping raising/lowering bodies in a state of being separated furthest and a lifting raising/lowering body at an intermediate position thereof.
Figure 19:
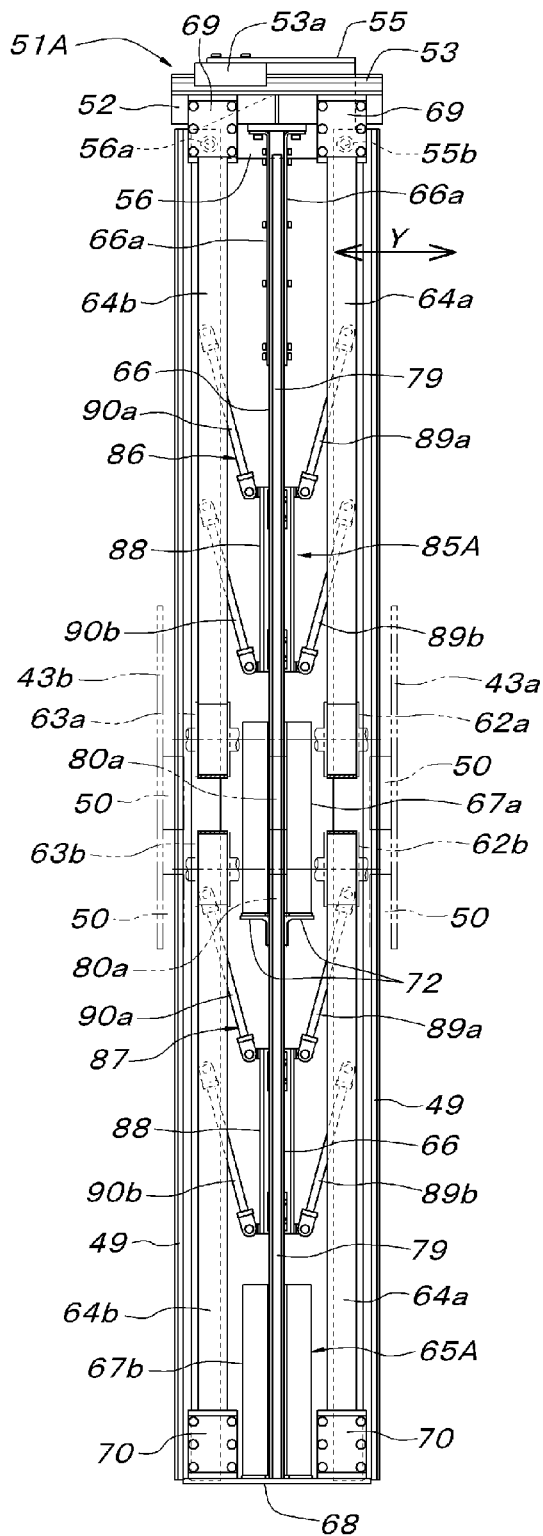
FIG. 19 is a side view showing the Y-direction pair of gripping raising/lowering bodies in a state of being brought closest together and the lifting raising/lowering body at the intermediate position thereof.

As shown in FIG. 14 and FIG. 18, upper end portions of the gripping raising/lowering bodies 45a and 45b that are aligned in parallel in the Y direction are coupled by a coupling means 51A in a manner enabling moving close to and away from each other in the Y direction, and upper end portions of the gripping raising/lowering bodies 46a and 46b that are aligned in parallel in the Y direction are coupled by a coupling means 51B in a manner enabling moving close to and away from each other in the Y direction. The two coupling means 51A and 51B are of mutually point symmetrical structure in a planar view, slide guide rails 53 and 54 are attached in parallel to the Y direction to an upper side surface and an inner side surface of each square columnar member 52 that is long in the Y direction, L-shaped support plates 55, supporting upper ends of the gripping raising/lowering bodies 45a and 46a, are mounted to slide blocks 53a fitted to the upper-side slide guide rails 53, and support plates 56, supporting upper ends of the gripping raising/lowering bodies 45b and 46b, are mounted to slide blocks 54a fitted to the inner-side slide guide rails 54.

Figure 15:
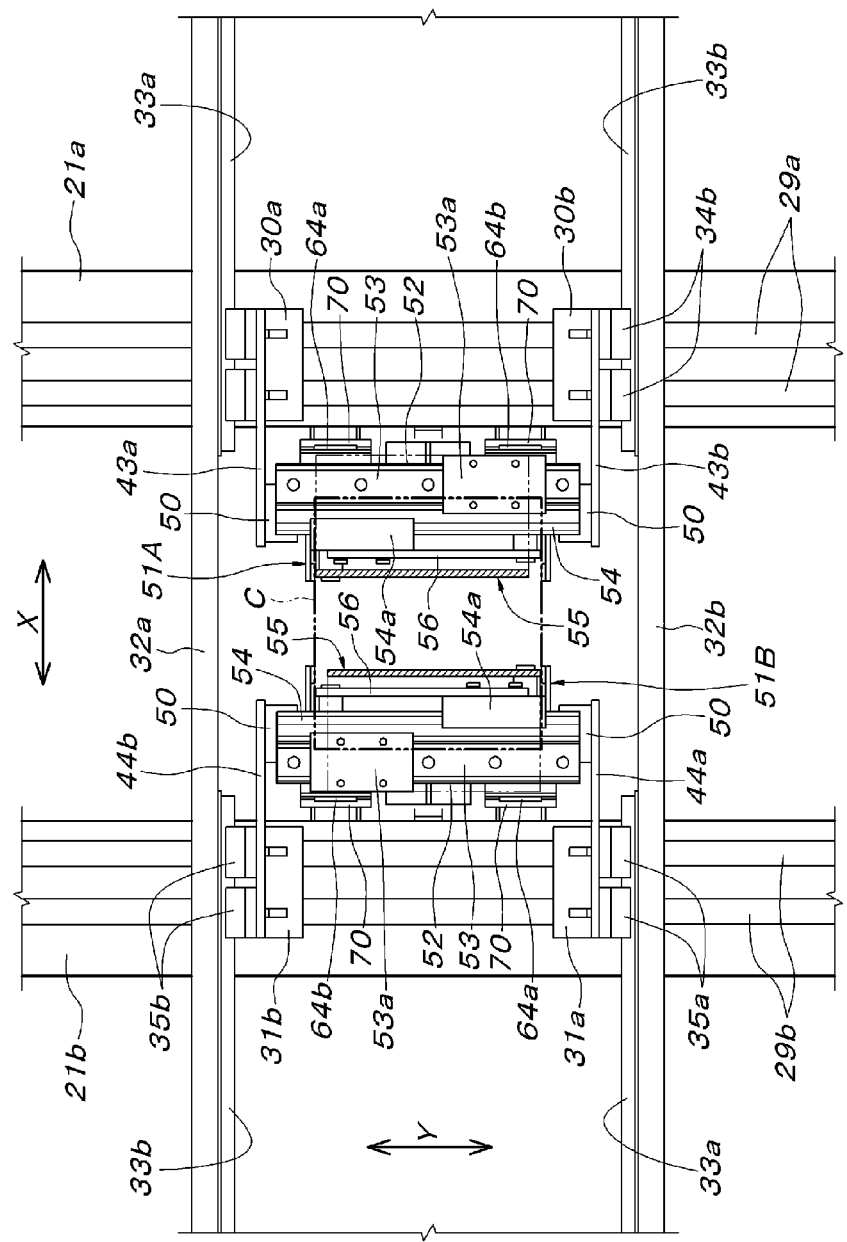
FIG. 15 is a partial transverse sectional plan view of a state where the four gripping raising/lowering bodies are brought closest to a center of a container gripping area.

The upper ends of the gripping raising/lowering bodies 45a and 46a and the L-shaped support plates 55 are coupled, at upper end inner sides of Y-direction plate portions parallel to the Y direction of the gripping raising/lowering bodies 45a and 46a and outer end portions of vertical plate portions 55a of the L-shaped support plates 55, by pivot shafts 55b parallel to the X direction that are adjacent to inner sides of the X-direction plate portions of the gripping raising/lowering bodies 45a and 46a. The upper ends of the gripping raising/lowering bodies 45b and 46b and the support plates 56 are coupled, at upper end inner sides of Y-direction plate portions of the gripping raising/lowering bodies 45b and 46b and outer end portions of the support plates 56, by pivot shafts 56a parallel to the X direction that are adjacent to inner sides of the X-direction plate portions of the gripping raising/lowering bodies 45b and 46b. A configuration is thus provided where, as shown in FIG. 15, when the Y-direction pair of gripping raising/lowering bodies 45a and 45b move closer to each other in the Y direction and the Y-direction pair of gripping raising/lowering bodies 46a and 46b move closer to each other in the Y direction, the support plates 56 supporting the gripping raising/lowering bodies 45b and 46b and the slide blocks 54a supporting these plates enter inner sides of the vertical plate portions 55a of the L-shaped support plates 55 supporting the gripping raising/lowering bodies 45a and 46a to enable the Y-direction pair of gripping raising/lowering bodies 45a and 45b to approach each other to a state of being disposed further inward than respective Y-direction ends of the square columnar member 52 in a planar view and the Y-direction pair of gripping raising/lowering bodies 46a and 46b to approach each other to a state of being disposed further inward than the respective Y-direction ends of the square columnar member 52 in a planar view.

By the above configuration, one Y-direction pair of gripping raising/lowering bodies 45a and 45b and the coupling means 51A positioned between the upper end portions thereof are made capable of being raised and lowered integrally with respect to the supporting members 43a and 43b (secondary movable bases 30a and 30b) supporting the gripping raising/lowering bodies 45a and 45b, and the other Y-direction pair of gripping raising/lowering bodies 46a and 46b and the coupling means 51B positioned between the upper end portions thereof are made capable of being raised and lowered integrally with respect to the supporting members 44a and 44b (secondary movable bases 31a and 31b) supporting the gripping raising/lowering bodies 46a and 46b.

As shown in FIG. 9, a raising/lowering drive means 57A that drives the raising and lowering of the gripping raising/lowering bodies 45a and 45b and the coupling means 51A is mounted to a lower side central portion of the main movable base 21a, and a raising/lowering drive means 57B that drives the raising and lowering of the gripping raising/lowering bodies 46a and 46b and the coupling means 51B is mounted to a lower side central portion of the main movable base 21b. The two raising/lowering drive means 57A and 57B are of mutually point symmetrical structure in the planar view shown in FIG. 9, and as shown in FIG. 9, FIG. 11B, FIG. 13, and FIG. 14, each includes a Y-direction pair of a main support plate 58a and a secondary support plate 58b, a Y-direction pair of drive pulleys 60a and 60b that are pivotally supported by a common drive shaft 59 between both main and secondary support plates 58a and 58b, a brake-equipped motor 61 supported by the main support plate 58a and interlockingly coupled to the drive pulleys 60a and 60b via the common drive shaft 59 and a transmission belt 59a, a pair of upper and lower guide pulleys 62a and 62b pivotally supported by each of the secondary support plate 58b and positioned above and below an inner side of the drive pulley 60a, a pair of upper and lower guide pulleys 63a and 63b pivotally supported by the main support plate 58a and positioned above and below an inner side of the drive pulley 60b, and a Y-direction pair of raising/lowering driving timing belts 64a and 64b.

As shown in FIG. 23, a lifting raising/lowering body 65A is provided between the gripping raising/lowering bodies 45a and 45b that are aligned in parallel in the Y direction and a lifting raising/lowering body 65B is provided between the gripping raising/lowering bodies 46a and 46b that are aligned in the Y direction. The respective lifting raising/lowering bodies 65A and 65B are of mutually symmetrical structure in the X direction, and as shown in FIG. 18, each is constituted from a vertical rod-shaped main body 66 having a length substantially equivalent to that of the gripping raising/lowering bodies 45a to 46b and two upper- and lower-stage support units 67a and 67b mounted to the vertical rod-shaped main body 66. The vertical rod-shaped main body 66 has its upper end portion coupled via mounting plates 66a to a center position of Y-direction length of the square columnar member 52 of the corresponding coupling means 51A or 51B and has a belt coupling plate 68 of flat plate shape long in the Y direction mounted in an inverted T shape to its lower end.

Figure 16:
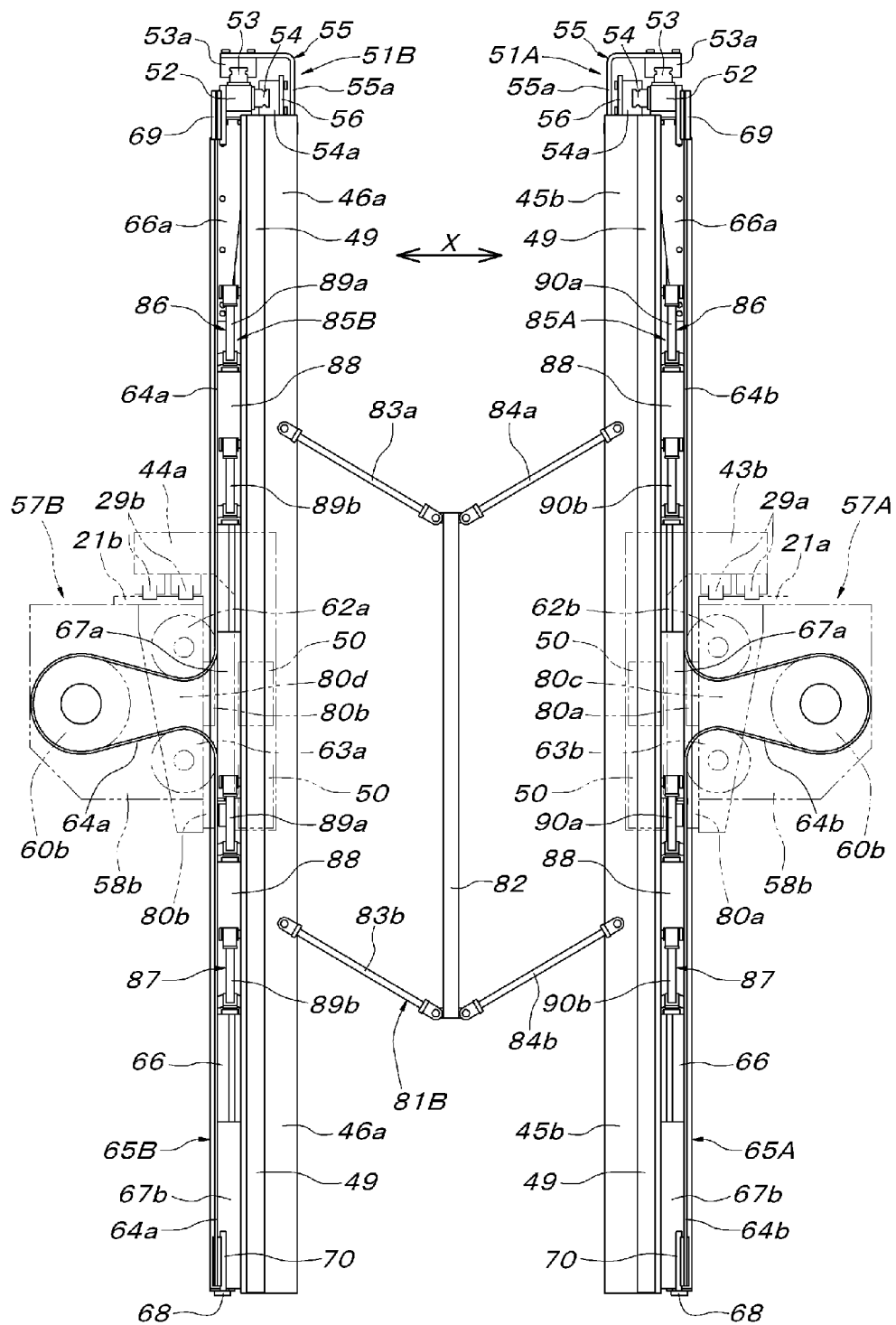
FIG. 16 is a front view showing a state where an X-direction pair of gripping raising/lowering bodies are separated furthest from each other.
Figure 17:
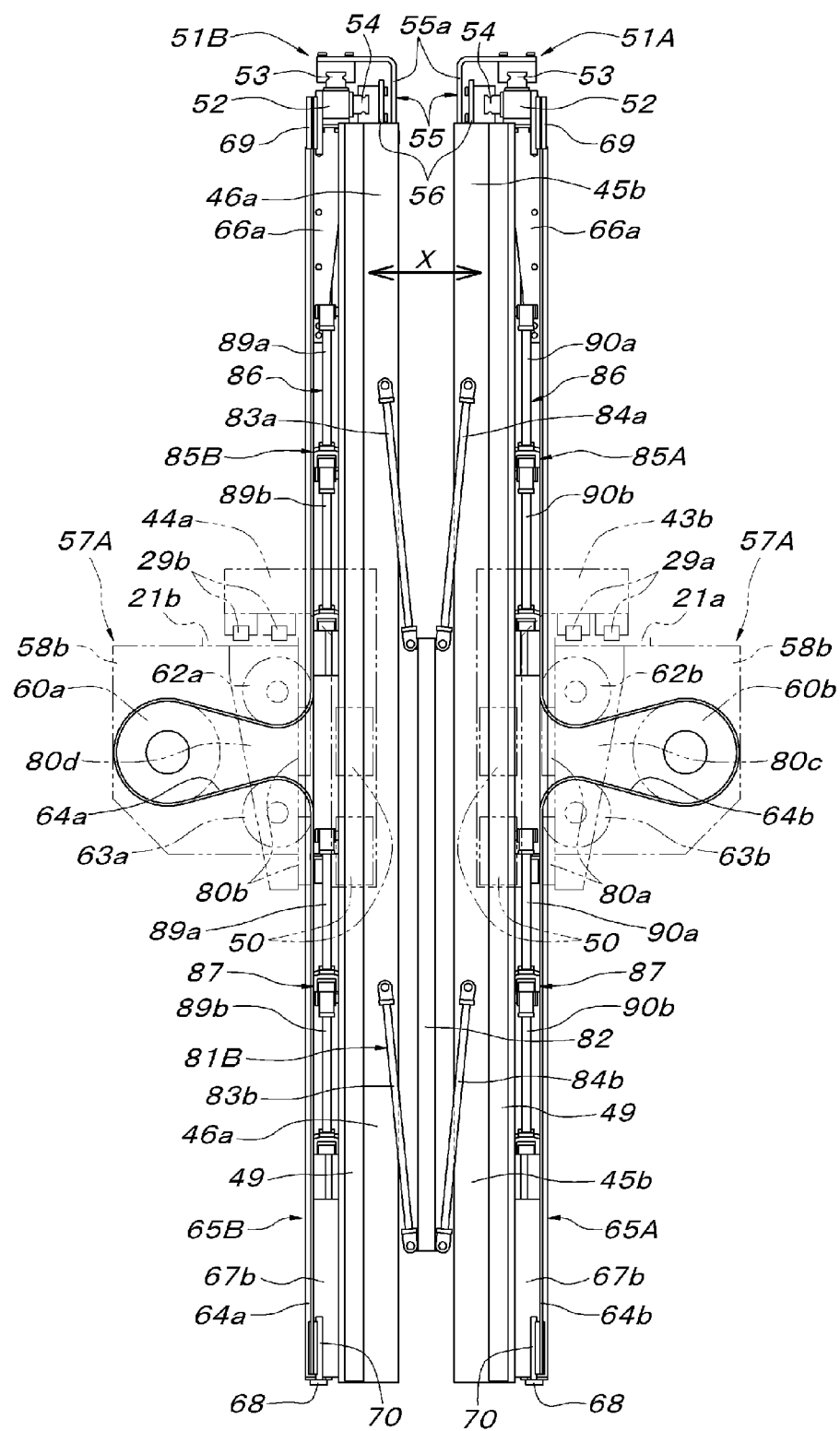
FIG. 17 is a front view showing a state where the X-direction pair of gripping raising/lowering bodies are brought closest to each other.

The raising/lowering driving timing belts 64a and 64b of each of the raising/lowering drive means 57A and 57B are positioned symmetrically at respective sides in the Y direction of the vertical rod-shaped main body 66 of the corresponding lifting raising/lowering body 65A or 65B, have one ends thereof respectively coupled via belt mounting members 69 to outer side surfaces of respective end portions of the Y direction length of the square columnar member 52, have other ends thereof respectively coupled via belt mounting members 70 to upper sides of respective end portions of Y direction length of the belt coupling plate 68, and, as shown in FIG. 16, with each of the raising/lowering drive means 57A and 57B, an intermediate portion of the raising/lowering driving timing belt 64*a* is wound around the drive pulley 60*a* via the pair of upper and lower guide pulleys 62*a* and 62*b* and an intermediate portion of the raising/lowering driving timing belt 64*b* is wound around the drive pulley 60*b* via the pair of upper and lower guide pulleys 63*a* and 63*b*. Portions of the raising/lowering driving timing belt 64*a* between the upper end and the guide pulley 62*a* and between the lower end and the guide pulley 62*b* and portions of the raising/lowering driving timing belt 64*b* between the upper end and the guide pulley 63*a* and between the lower end and the guide pulley 63*b* are stretched without looseness in parallel to the gripping raising/lowering bodies 45*a* to 46*b* (the vertical rod-shaped main bodies 66).

With the respective raising/lowering drive means 57A and 57B configured as described above, when the brake-equipped motors 61 of both raising/lowering drive means 57A and 57B are not in operation (when the drive pulleys 60*a* and 60*b* are in a braked state), all of the gripping raising/lowering bodies 45*a* to 46*b* and the vertical rod-shaped main bodies 66 of the lifting raising/lowering bodies 65A and 65B are put in states of being locked so as to be unable to be raised or lowered and are stopped at heights at that point. When the brake-equipped motors 61 of both raising/lowering drive means 57A and 57B are put in synchronous operation to perform synchronous driving of the respective raising/lowering driving timing belts 64*a* and 64*b* in directions of pulling up the lower ends via the drive pulleys 60*a* and 60*b*, all of the gripping raising/lowering bodies 45*a* to 46*b* and the vertical rod-shaped main bodies 66 of the lifting raising/lowering bodies 65A and 65B are moved upward integrally at a fixed speed against gravity, and oppositely when driving in directions of pulling down the upper ends is performed, all of the gripping raising/lowering bodies 45*a* to 46*b* and the vertical rod-shaped main bodies 66 of the lifting raising/lowering bodies 65A and 65B are moved downward integrally at a fixed speed due to gravity.

All of the support units 67*a* and 67*b* included in the lifting raising/lowering bodies 65A and 65B are of the same structure and, as shown in FIG. 18, FIG. 21, and FIG. 22, each is supported on the corresponding vertical rod-shaped main body 66 so as to be capable of being raised and lowered via a slide guide rail 71 attached to an inner side of the vertical rod-shaped main body 66 so as to be continuous over an entire length and two upper and lower slide blocks 71*a* fitted to the slide guide rail 71 so as to be capable of being raised and lowered, with the upper-side support unit 67*a* being received and retained by a pair of receiving members 72 attached at an intermediate height to the respective sides in the Y direction of the vertical rod-shaped main body 66 and the lower-side support unit 67*b* being received and retained by the belt coupling plate 68 at the lower end of the vertical rod-shaped main body 66.

Each of the support units 67*a* and 67*b* includes a longitudinally long hollow casing 75. The casing 75 includes a base plate 73, positioned at the inner side of the vertical rod-shaped main body 66 and being of width such that it juts out to both sides in the Y direction of the vertical rod-shaped main body 66, and back plates 74*a* and 74*b*, disposed at the respective sides in the Y direction of the vertical rod-shaped main body 66 at a rear side of the base plate 73, and the slide blocks 71*a* are mounted to the rear side of the base plate 73 and between the back plates 74*a* and 74*b*. Also, the casing 75 includes a plurality of pin-shaped supporting implements 76*a* and 76*b* supported by the base plate 73 and the back plates 74*a* and 74*b* and being extendable and retractable in the X direction with respect to the base plate 73. Each of the pin-shaped supporting implements 76*a* and 76*b* is impelled in a direction of protruding toward an inner side from the base plate 73 by an extension coil spring 78 loosely fitted to each of the pin-shaped supporting implements 76*a* and 76*b* inside the casing 75 and between the back plate 74*a* or 74*b* and a flange portion 77 possessed by each of the pin-shaped supporting implements 76*a* and 76*b*, and the flange portion 77 is thereby held at a protrusion limit position of contacting the base plate 73. With the respective pin-shaped supporting implements 76*a* and 76*b*, pairs of pin-shaped supporting implements 76*a* disposed across a narrow interval and symmetrically in the Y direction with respect to a vertical direction center line (center line between the two gripping raising/lowering bodies 45*a* and 45*b* or 46*a* and 46*b* aligned in parallel in the Y direction) of the vertical rod-shaped main body 66 when viewed from the X direction and pairs of pin-shaped supporting implements 76*b* disposed across a broad interval and symmetrically in the Y direction with respect to the center line are aligned alternately at vertical direction intervals such that the respective pin-shaped supporting implements 76*a* and 76*b* overlap mutually partially in the vertical direction when viewed from the Y direction.

The vertical rod-shaped main body 66 of each of the lifting raising/lowering bodies 65A and 65B has a slide guide rail 79 attached, so as to be continuous over an entire length, to an outer side opposite the inner side at which the support units 67*a* and 67*b* are supported, and slide blocks 80*a* or 80*b*, fitted to the slide guide rail 79 and supporting each vertical rod-shaped main body 66 so as to be capable of being raised and lowered, are mounted to an inner side edge of a vertical supporting member 80*c* or 80*d*, an upper end of which is joined to a bottom surface of the main movable base 21*a* or 21*b*. The vertical rod-shaped main body 66 of each of the lifting raising/lowering bodies 65A and 65B is thus supported by the main movable base 21*a* or 21*b* so as to be capable of being raised and lowered just at a center position between the two gripping raising/lowering bodies 45*a* and 45*b* or 46*a* and 46*b* aligned in parallel in the Y direction, and in regard to the raising and lowering, the two gripping raising/lowering bodies 45*a* and 45*b* aligned in parallel in the Y direction and the vertical rod-shaped main body 66 of the lifting raising/lowering body 65A at an intermediate position thereof undergo raising and lowering motions integrally and the two gripping raising/lowering bodies 46*a* and 46*b* aligned in parallel in the Y direction and the vertical rod-shaped main body 66 of the lifting raising/lowering body 65B at an intermediate position thereof undergo raising and lowering motions integrally.

Figure 20A:
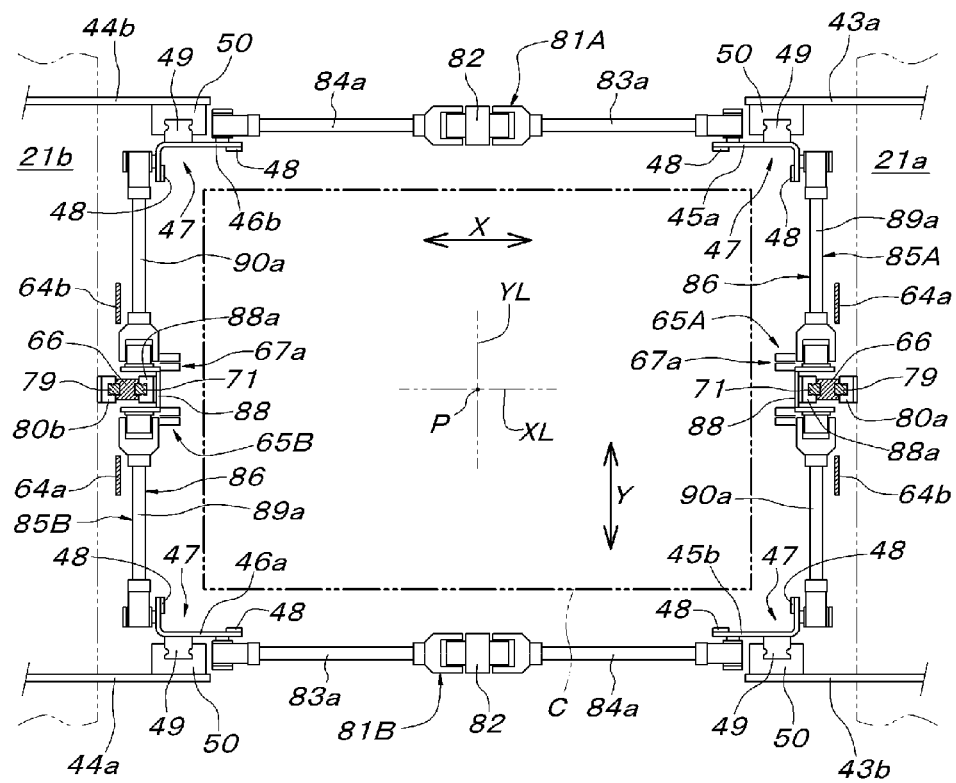
FIG. 20A is a partial transverse sectional plan view showing a state where the four gripping raising/lowering bodies and the X-direction pair of lifting raising/lowering bodies are separated furthest from each other.
Figure 20B:
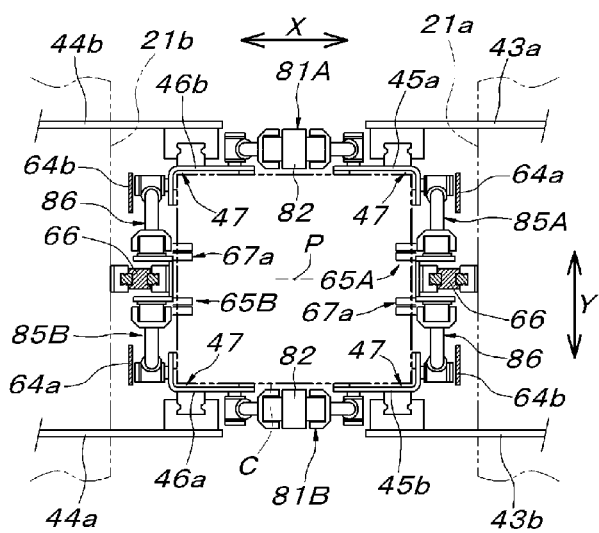
FIG. 20B is a partial transverse sectional plan view showing a state where the four gripping raising/lowering bodies and the X-direction pair of lifting raising/lowering bodies are brought closest to each other.
Figure 22A:
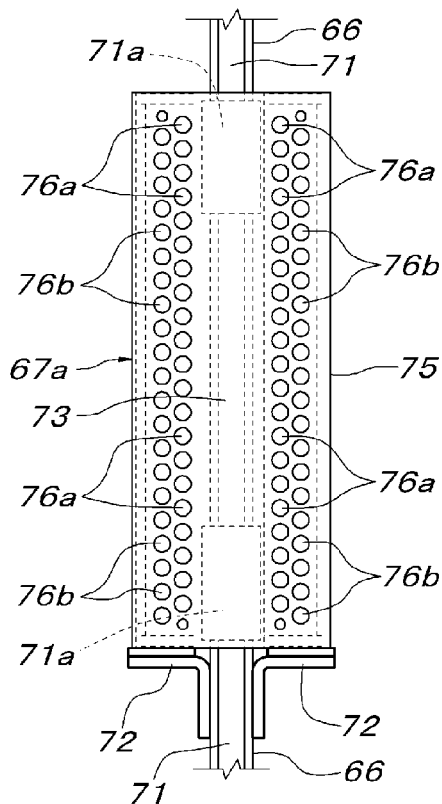
FIG. 22A is an enlarged front view showing a lower side support unit included in a lifting raising/lowering body.
Figure 22B:
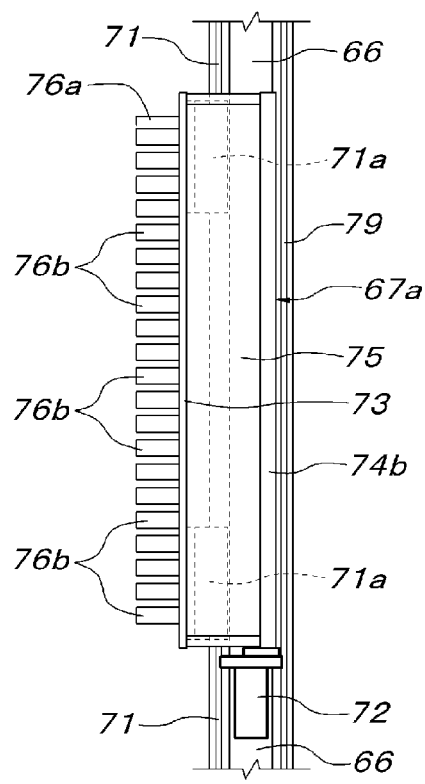
FIG. 22B is a side view of the same.
Figure 22C:
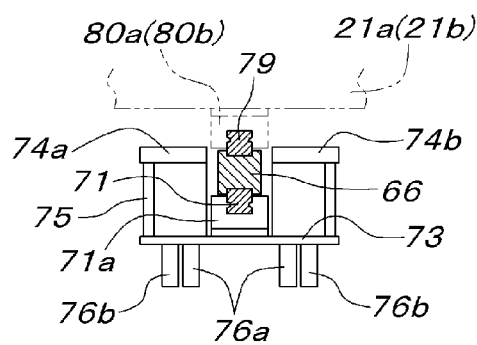
FIG. 22C is a transverse sectional plan view of the same.
Figure 22D:
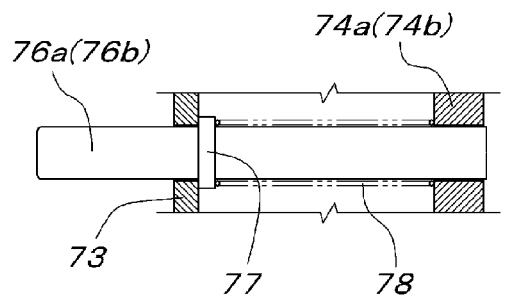
FIG. 22D is an enlarged longitudinal sectional side view of essential parts of the same.

As shown in FIG. 16 and FIG. 20, among the gripping raising/lowering bodies 45*a* to 46*b*, the two gripping raising/lowering bodies 45*a* and 46*b* aligned in parallel in the X direction have interposed therebetween a parallelogram link mechanism 81A for allowing just parallel movement of the two bodies in the X direction and the two gripping raising/lowering bodies 45*b* and 46*a* aligned in parallel in the X direction have interposed therebetween a parallelogram link mechanism 81B for allowing just parallel movement of the two bodies in the X direction. The parallelogram link mechanisms 81A and 81B are of the same structure mutually and each is constituted of a central raising/lowering link member 82, a pair of upper and lower rocking parallel links 83a and 83b that are interposed between the central raising/lowering link member 82 and the gripping raising/lowering body 45a or 46a at one side, and a pair of upper and lower rocking parallel links 84a and 84b that are interposed between the central raising/lowering link member 82 and the gripping raising/lowering body 45b or 46b at the other side. Each upper-side rocking parallel link 83a is pivotally supported at each of an upper end of the central raising/lowering link member 82 and a higher position at the outer side of the X-direction plate portion of the gripping raising/lowering body 45a or 46a, each upper-side rocking parallel link 84a is pivotally supported at each of the upper end of the central raising/lowering link member 82 and a higher position at the outer side of the X-direction plate portion of the gripping raising/lowering body 46b or 45b, each lower-side rocking parallel link 83b is pivotally supported at each of a lower end of the central raising/lowering link member 82 and the outer side of the X-direction plate portion of the gripping raising/lowering body 45a or 46a so as to be parallel to the rocking parallel link 83a positioned directly above, and each lower-side rocking parallel link 84b is pivotally supported at each of the lower end of the central raising/lowering link member 82 and the outer side of the X-direction plate portion of the gripping raising/lowering body 46b or 45b so as to be parallel to the rocking parallel link 84a positioned directly above to provide a configuration where in a situation where an interval between the two gripping raising/lowering bodies 45a and 46b aligned in parallel in the X direction and an interval between the two gripping raising/lowering bodies 45a and 46b aligned in parallel in the X direction are spread maximally, the rocking parallel links 83a to 84b are inclined obliquely upward with respect to each central raising/lowering link 82 as shown in FIG. 16.

As shown in FIG. 18 and FIG. 20, among the gripping raising/lowering bodies 45a to 46b, the two gripping raising/lowering bodies 45a and 45b aligned in parallel in the Y direction have interposed therebetween a parallelogram link mechanism 85A for allowing just parallel movement of the two bodies in the Y direction and the two gripping raising/lowering bodies 46a and 46b aligned in parallel in the Y direction have interposed therebetween a parallelogram link mechanism 85B for allowing just parallel movement of the two in the Y direction. Both parallelogram link mechanisms 85A and 85B are of the same structure mutually and each includes two upper- and lower-stage raising/lowering link units 86 and 87. Each upper-side raising/lowering link unit 86 is disposed higher than the upper-side support unit 67a at the corresponding lifting raising/lowering body 65A or 65B, and the lower-side raising/lowering link unit 87 is disposed at an intermediate position between the respective upper and lower support units 67a and 67b at the corresponding lifting raising/lowering bodies 65A or 65B.

The two upper- and lower-stage raising/lowering link units 86 and 87 are of the same structure mutually and each is constituted of a central raising/lowering link member 88, which is supported, so as to be capable of being raised and lowered, via two upper and lower slide blocks 88a by the slide guide rail 71 at the inner side of the vertical rod-shaped main body 66 of the corresponding lifting raising/lowering body 65A or 65B, a pair of upper and lower rocking parallel links 89a and 89b that are interposed between the central raising/lowering link member 88 and the gripping raising/lowering body 45a or 46a at one side, and a pair of upper and lower rocking parallel links 90a and 90b that are interposed between the central raising/lowering link member 88 and the gripping raising/lowering body 45b or 46b at the other side. Each upper-side rocking parallel link 89a is pivotally supported at each of an upper end of the central raising/lowering link member 88 and a higher position at an outer side of the Y-direction plate portion of the gripping raising/lowering body 45a or 46a, each upper-side rocking parallel link 90a is pivotally supported at each of the upper end of the central raising/lowering link member 88 and a higher position at the outer side of the Y-direction plate portion of the gripping raising/lowering body 46b or 45b, each lower-side rocking parallel link 89b is pivotally supported at each of a lower end of the central raising/lowering link member 88 and the outer side of the Y-direction plate portion of the gripping raising/lowering body 45a or 46a so as to be parallel to the rocking parallel link 89a positioned directly above, and each lower-side rocking parallel link 90b is pivotally supported at each of the lower end of the central raising/lowering link member 88 and the outer side of the Y-direction plate portion of the gripping raising/lowering body 46b or 45b so as to be parallel to the rocking parallel link 90a positioned directly above to provide a configuration where, as shown in FIG. 18, in a situation where an interval between the gripping raising/lowering bodies 45a and 45b and an interval between the gripping raising/lowering bodies 46a and 46b are spread maximally, the rocking parallel links 89a to 90b are inclined obliquely upward with respect to each central raising/lowering link 88. As a matter of course, in the situation where the interval between the gripping raising/lowering bodies 45a and 45b and the interval between the gripping raising/lowering bodies 46a and 46b are spread maximally, each central raising/lowering link member 88 is disposed at a position separated furthest upward from the support unit 67a or 67b positioned therebelow of the corresponding lifting raising/lowering 65A or 65B.

To now describe a method of use and actions, containers C are placed in an orientation where respective side edges thereof are parallel to the X direction and the Y direction in a planar view in the storage area of rectangular planar shape surrounded by the rectangular frame structure 4. In this process, spaces for raising and lowering the gripping raising/lowering bodies 45a to 46b and the lifting raising/lowering bodies 65A and 65B included in the conveyance apparatus 1 are secured between mutually adjacent containers C. Also, although it is possible to place a single container C independently inside the storage area, in most cases, a plurality of containers C of the same size in a planar view are stacked. As a matter of course, in regard to the size in a planar view, containers C of various sizes within a set range of minimum size and maximum size are handled. As shown in FIG. 20 and FIG. 23, together with container size information, stacking information, and other necessary information, position information of each container C placed inside the storage area is recorded as absolute X-Y coordinate values on the storage area of a center position P in a planar view of the container C in a recording means included in a control unit for automatic operation of the conveyance apparatus 1.

Figure 24:
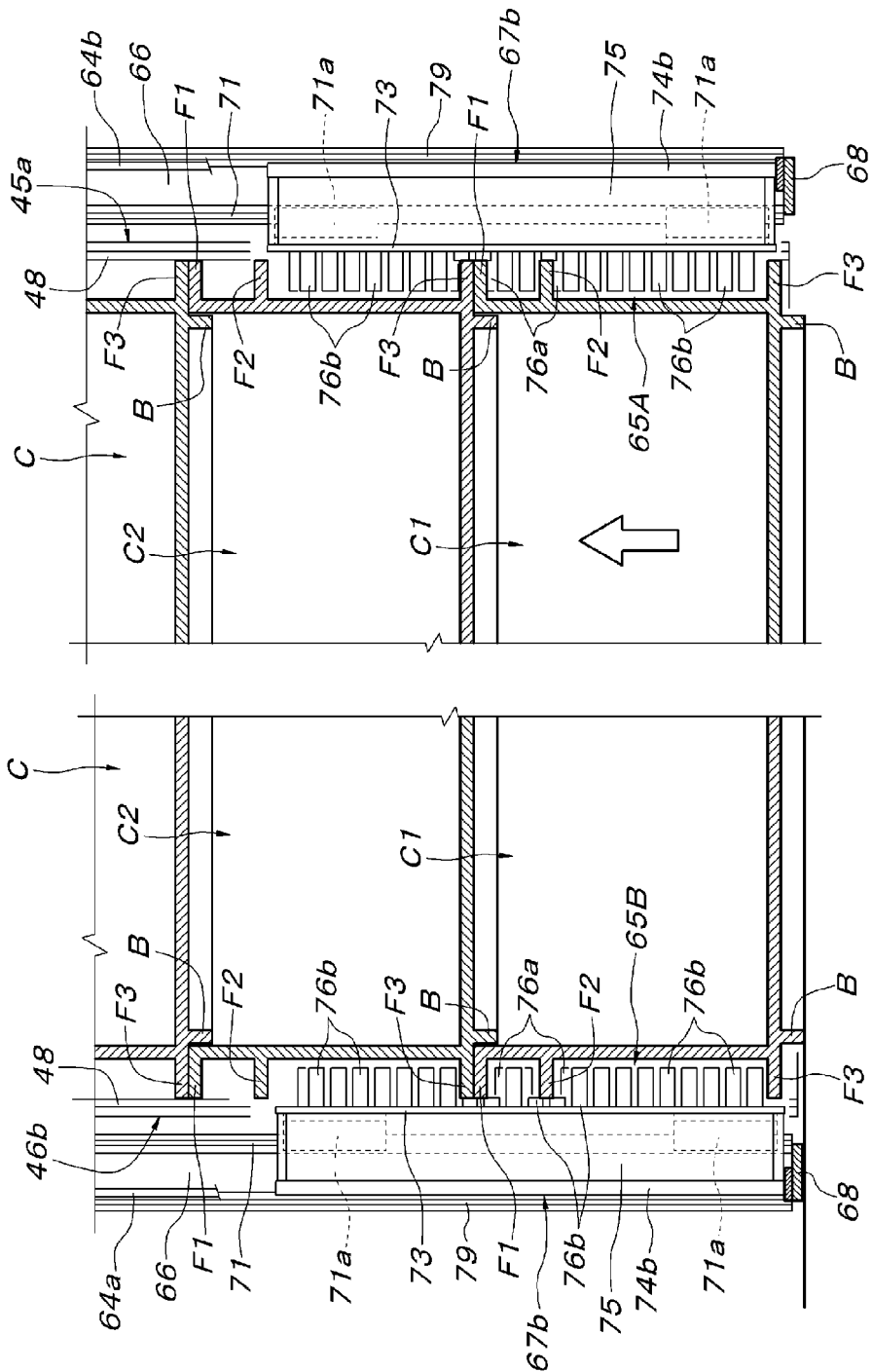
FIG. 24 is a longitudinal sectional front view for describing actions of the lifting raising/lowering bodies with respect to the container with the left half showing a state immediately before the container is lifted up and the right half showing a state immediately after the container is lifted up.
Figure 25:
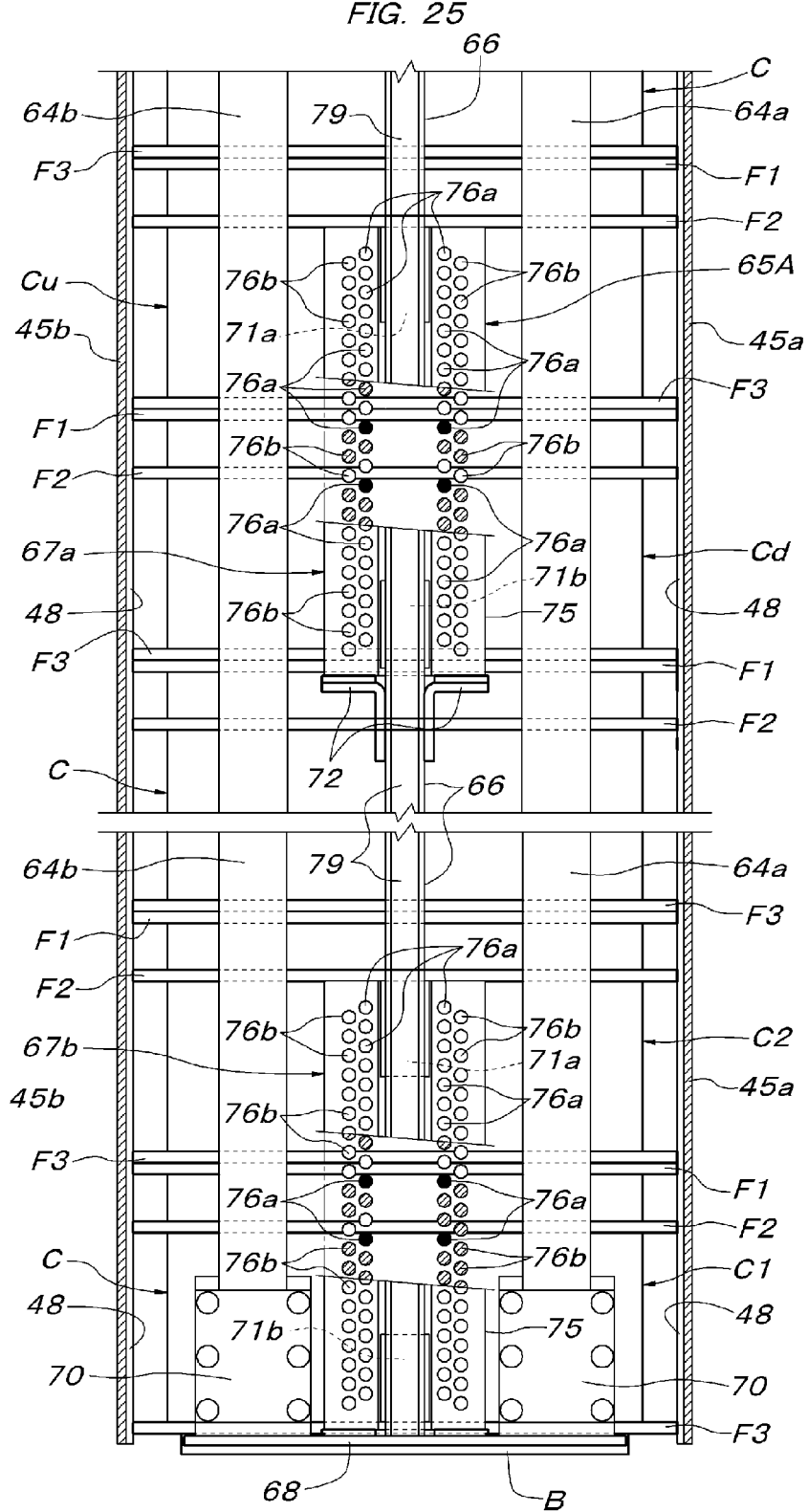
FIG. 25 is a partially cutaway, partial longitudinal sectional side view showing a state where the container is lifted and conveyed by the lifting raising/lowering bodies.

On the other hand, as shown in FIG. 23 to FIG. 25, each of all containers C handled in the present storage facility includes reinforcing flange portions F1 to F3 jutting out continuously across an entire periphery at three positions of a highest end, a position directly below the highest end, and a lowest end, and includes a leg wall portion B at a bottom surface. Therefore, when the containers C of the same planar size are stacked, a leg wall portion B of an upper-side container C fits inside an opening portion of a lower-side container C to prevent positional shifting of both the upper and lower containers C and, at the same time, the lowest end flange portion F3 of the upper-side container C overlaps onto the highest end flange portion F1 of the lower-side container C. In the present invention, the two upper and lower flange portions F1 and F2 at an upper side of each container C is utilized as protruding portions with which the pin-shaped supporting implements 76a and 76b of the respective support units 67a and 67b of the lifting raising/lowering bodies 65A and 65B engage when lifting the container C.

As shown in FIG. 14 and FIG. 20A, the gripping raising/lowering bodies 45a to 46b and the lifting raising/lowering bodies 65A and 65B included in the conveyance apparatus 1 are, in a planar view, positioned at standby home positions, located further outward than a maximum planar view size of a container C that can be handled, within a quadrilateral vertical-direction through opening portion surrounded by the X-direction pair of main movable bases 21a and 21b and the Y-direction pair of interlocking rod-shaped bodies 32a and 32b, and, in side view, put on standby at raising limit heights higher than a maximum container stacking height inside the storage area. From this state, by moving the X-direction pair of main movable bases 21a and 21b closer to each other synchronously in the X direction by putting the motor 26 of the X-direction drive means 22 into operation as described above and moving the Y-direction pair of secondary movable bases 30a and 30b and the Y-direction pair of secondary movable bases 31a and 31b on the respective main movable bases 21a and 21b closer to each other synchronously in the Y direction by putting the motor 40 of the Y-direction drive means 36 into operation, the right-angled parallelogram surrounded by the four gripping raising/lowering bodies 45a to 46b is shrunk as shown in FIG. 10, and oppositely by moving the X-direction pair of main movable bases 21a and 21b away from each other synchronously in the X direction and moving the Y-direction pair of secondary movable bases 30a and 30b and the Y-direction pair of secondary movable bases 31a and 31b away from each other synchronously in the Y direction, the gripping raising/lowering bodies 45a to 46b and the lifting raising/lowering bodies 65A and 65B are returned to the standby home positions shown in FIG. 20A. The lifting raising/lowering bodies 65A and 65B are always positioned at the respective center positions between the Y-direction pair of gripping raising/lowering bodies 45a and 45b and between the Y-direction pair of gripping raising/lowering bodies 46a and 46b.

That is, the X-direction drive means 22 moves the four gripping raising/lowering bodies 45a to 46b, mutually symmetrically and in synchronization, closer to and away from a Y-direction center line YL, among an X-direction center line XL and the Y-direction center line YL passing through the center position of the right-angled parallelogram surrounded by the four gripping raising/lowering bodies 45a to 46b and parallel to respective side edges of the right-angled parallelogram, the Y-direction drive means 36 moves the four gripping raising/lowering bodies 45a to 46b, mutually symmetrically and in synchronization, closer to and away from the X-direction center line XL, and a configuration is thus provided where the four gripping raising/lowering bodies 45a to 46b can be moved horizontally in synchronization by both the X- and Y-direction drive means 22 and 36 so as to enlarge or shrink the right-angled parallelogram surrounded by the four gripping raising/lowering bodies 45a to 46b without changing the center position and the orientation of the right-angled parallelogram.

To retrieve a container C placed and stored at a specific position inside the storage area, automatic operation of the conveyance apparatus 1 is performed in accordance with the position information of the container C to be retrieved to laterally move the main traveling body 2 in the Y direction and laterally move the secondary traveling body 3 on the main traveling body 2 in the X direction so that a center of the right-angled parallelogram surrounded by the gripping raising/lowering bodies 45a to 46b, on standby at the standby home positions on the secondary traveling body 3, is moved to a position (retrieval operation starting position) at which it matches the center position P of the container C to be retrieved in a planar view. When the gripping raising/lowering bodies 45a to 46b, on standby at the standby home positions, have been positioned at the retrieval operation starting position, which is a prescribed position directly above the container C to be retrieved, both the X- and Y-direction drive means 22 and 36 are put in operation to move the respective gripping raising/lowering bodies 45a to 46b closer to each other in synchronization to positions (lowering starting positions) corresponding to respective corners of a right-angled parallelogram that is larger by just prescribed dimensions than a planar size of the container C to be retrieved. The present process of moving the gripping raising/lowering bodies 45a to 46b, on standby at the standby home positions, closer to each other in synchronization to the lowering starting positions may be performed overlappingly with the process of moving the gripping raising/lowering bodies 45a to 46b, on standby at the standby home positions on the secondary traveling body 3, in both the X and Y directions to the retrieval operation starting position.

When, at the retrieval operation starting position, the gripping raising/lowering bodies 45a to 46b have been moved to the lowering starting positions, the raising/lowering drive means 57A and 57B are put in operation to move the gripping raising/lowering bodies 45a to 46b and the vertical rod-shaped main bodies 66 of the lifting raising/lowering bodies 65A and 65B downward integrally and in synchronization to a lowering limit level at which the belt coupling plates 68 of the vertical rod-shaped main bodies 66 are put in close proximity to the floor surface of the storage area. Next, both the X- and Y-direction drive means 22 and 36 are put in operation to move the respective gripping raising/lowering bodies 45a to 46b, at positions separated by just equal distances from the four corners of the container C to be retrieved (the four corners of the respective flange portions F1 to F3), in synchronization closer toward the center position P of the container C to be retrieved to thereby fit the fitting portions 47 of the respective gripping raising/lowering bodies 45a to 46b to the respective corners of the container C to be retrieved and put the anti-slip strip bodies 48 at the respective right-angled side edges of the respective fitting portions 47 in press contact with the respective corners of the container C to be retrieved as shown in FIG. 23.

Although points of action of moving the gripping raising/lowering bodies 45a to 46b inward in the X direction and the Y direction in this process are the positions of the slide blocks 50 at the supporting member 43a to 44b sides with respect to the raising/lowering guide rails 49 attached to the gripping raising/lowering bodies 45a to 46b and when the container C on the floor surface of the storage area is being gripped, the gripping raising/lowering bodies 45a to 46b are in cantilevered states of extending long downward from the positions of the slide blocks 50, which are at the supporting member 43a to 44b sides and are the points of action, the four gripping raising/lowering bodies 45*a* to 46*b* are coupled to each other in the X direction and the Y-direction by the parallelogram link mechanisms 81A and 81B and the parallelogram link mechanisms 85A and 85B, respectively, so that the parallelogram link mechanisms 81A, 81B, 85A, 85B hold the gripping raising/lowering bodies 45*a*, 45*b*, 46*a*, 46*b* that are aligned in parallel in the X direction and Y direction in the mutually parallel orientations and, at the same time, gravity acting on the central raising/lowering link members 82 and the central raising/lowering link members 88 at the centers of the link mechanisms impel the gripping raising/lowering bodies 45*a* to 46*b* in directions of moving closer to each other in the X direction and the Y direction via the respective rocking parallel links 83*a* to 84*b* and 89*a* to 90*b*, and therefore the respective corners of stacked containers C can be gripped reliably by the four gripping raising/lowering bodies 45*a* to 46*b*.

In this process, the vertical rod-shaped main bodies 66 of the lifting raising/lowering bodies 65A and 65B move rectilinearly in the X direction and closer toward a width-direction center position of two side surfaces, parallel to the Y direction, of the container C to be retrieved, and due to the two upper- and lower-stage support units 67*a* and 67*b* supported by the vertical rod-shaped main bodies 66 being of structures such that, in a planar view as shown in FIG. 23, the pin-shaped supporting implements 76*a* and 76*b* protrude further inward than X-direction contacting surfaces (surfaces of the anti-slip strip bodies 48) of the gripping raising/lowering bodies 45*a* and 45*b* and the gripping raising/lowering bodies 46*a* and 46*b* at the respective sides in the Y direction, in the process in which the fitting portions 47 of the gripping raising/lowering bodies 45*a* to 46*b* fit onto the respective corners of the container C to be retrieved as described above, each pin-shaped supporting implement, which, among the pin-shaped supporting implements 76*a* and 76*b* included in the two upper- and lower-stage support units 67*a* and 67*b*, is at a position where even a portion of a distal end surface thereof contacts an outer side surface of the container C to be retrieved, that is, a peripheral side surface of any of the respective flange portions F1 to F3, is received and retained by the peripheral side surface of the corresponding flange portion among the respective flange portions F1 to F3 and is thus retracted relatively into the casing 75 against an impelling force of the extension coil spring 78 while pin-shaped supporting implements besides the above are inserted both above and underneath the respective flange portions F1 to F3 in protruded states in accordance with the movements of the support units 67*a* and 67*b*.

In the example shown in FIG. 24 and FIG. 25, among the stacked containers C to be retrieved, a container C1 at a lowest stage and a container C2 immediately thereabove are adjacent to the lower-side support units 67*b* and two upper- and lower-stage containers Cu and Cd positioned at intermediate heights are adjacent to the upper-side support units 67*a*, and among the pin-shaped supporting implements 76*a* and 76*b* in the two upper- and lower-stage support units 67*a* and 67*b*, the several pin-shaped supporting implements 76*a* and 76*b*, which will face the vertically overlapped flange portions F3 and F1, between the two upper- and lower-stage containers C1 and C2 and between the two upper- and lower-stage containers Cu and Cd adjacent to the respective support units 67*a* and 67*b*, and the second-stage flange portions F2 of the lower-side containers C1 and Cd, will be retracted relatively into the casings 75 against the impelling forces of the extension coil springs 78 and the other pin-shaped supporting implements 76*a* and 76*b* will be inserted between the respective upper and lower flange portions F1 and F2 and between the respective upper and lower flange portions F2 and F3 of the respective containers C1, C2, Cu, and C2 while remaining in the protruded states (state shown in the left half of FIG. 24).

Next, when the raising/lowering drive means 57A and 57B are put in operation and the gripping raising/lowering bodies 45*a* to 46*b* and the vertical rod-shaped main bodies 66 of the lifting raising/lowering bodies 65A and 65B that are at the lowering limit level are moved upward in synchronization to a raising limit level, the pin-shaped supporting implements, which, among the pin-shaped supporting implements 76*a* and 76*b* of the support units 67*a* and 67*b*, are positioned in protruding states directly below the two upper and lower flange portions F1 and F2 at the upper sides of the respective containers C, that is, in the example of FIG. 25, the inner-side pairs of right and left pin-shaped supporting implements 76*a* indicated in solid black lift up the lowest-stage container C1 and the container Cd of intermediate height via the flange portions F1 and F2 of each by the raising of the support units 67*a* and 67*b* in states of being supported by the lower-end belt coupling plates 68 and the intermediate-height receiving members 72 of the vertical rod-shaped main bodies 66. As a matter of course, depending on an interval between the two upper and lower flange portions F1 and F2, an interval between the flange portions F2 and F3, or thicknesses of the flange portions F1 and F2, the lowest-stage container C1 and the intermediate-height container Cd may be lifted up via just one of either of the flange portions F1 and F2 by inner-side pairs of right and left pin-shaped supporting implements 76*a* or outer-side pairs of right and left pin-shaped supporting implements 76*b* among the pin-shaped supporting implements 76*a* and 76*b*.

As is clear from the above description, when, as mentioned above, the container Cd that is lifted up by the upper-side support units 67*a* is present, the stacked containers are divided into an upper-side stacked container group having the container Cd as a lowest end and a lower-side stacked container group having the container directly below the container Cd as a highest end, the upper-side stacked container group is lifted up via the lowest-end container C by the upper-side support units 67*a* and the lower-side stacked container group is lifted up via the lowest-end container C1 by the lower-side support units 67*b*. Obviously when the number of stages of stacked containers C is low and the container Cd that is lifted up by the upper-side support units 67*a* as mentioned above is not present, the stacked containers C will be lifted up via the lowest-stage container C1 by the lower-side support units 67*b*.

The containers C to be retrieved are lifted vertically upward from the floor surface of the storage area by the X-direction pair of lifting raising/lowering bodies 65A and 65B as described above, and in this process, the respective fitting portions 47 of the four gripping raising/lowering bodies 45*a* to 46*b* that rise integrally with the lifting raising/lowering bodies 65A and 65B fit onto and grip the four corners of the containers C to be retrieved, and therefore an entirety of the containers C to be retrieved is held in a vertically stacked orientation and tilting of the entirety of the stacked containers C in a lateral direction is prevented.

When the containers C to be retrieved that are positioned by the four gripping raising/lowering bodies 45*a* to 46*b* and supported by the X-direction pair of lifting raising/lowering bodies 65A and 65B have been raised to the raising limit level, the main traveling body 2 is moved laterally in Y direction and the secondary traveling body 3 is moved laterally in the X direction on the main traveling body 2 by automatic operation of the conveyance apparatus 1 so that the containers C to be retrieved are horizontally conveyed at a level higher than a maximum height of the containers C stored in stacked states inside the storage area to a position directly above the transferring end portion 7a of the retrieval conveyor 7. When the containers C to be retrieved that are positioned by the four gripping raising/lowering bodies 45a to 46b and supported by the X-direction pair of lifting raising/lowering bodies 65A and 65B have been raised to the raising limit level, the containers C are in a state of penetrating through the secondary traveling body 3 in the vertical direction at the quadrilateral vertical direction through opening portion surrounded by the X-direction pair of main movable bases 21a and 21b and the Y-direction pair of interlocking rod-shaped bodies 32a and 32b.

Thereafter, by actuating the four gripping raising/lowering bodies 45a to 46b and the X-direction pair of lifting raising/lowering bodies 65A and 65B by procedures directly reverse those of the operation of lifting up the containers C to be retrieved from the floor surface of the storage area, the containers C to be retrieved that are positioned by the four gripping raising/lowering bodies 45a to 46b and supported by the X-direction pair of lifting raising/lowering bodies 65A and 65B can be lowered onto the transferring end portion 7a of the retrieval conveyor 7. Also, to store a container to be stored, which has been conveyed in by the storage conveyor 6 to the transferring end portion 6a, at an available space inside the storage area, the container to be stored that is positioned on the transferring end portion 6a of the storage conveyor 6 is lifted up by the four gripping raising/lowering bodies 45a to 46b and the X-direction pair of lifting raising/lowering bodies 65A and 65B to the raising limit level by the same procedures as when lifting up the containers C to be retrieved from the floor surface of the storage area, and thereafter conveyed to the storage target position by automatic operation of the conveyance apparatus 1 and thereafter the container to be stored is lowered onto the storage target available space by the same procedures as when lowering the containers C to be retrieved onto the transferring end portion 7a of the retrieval conveyor 7.

With the storage facility described above, a single container or an entirety of a plurality of containers in a stacked state can be retrieved by conveying from a specific position on the storage area to the transferring end portion 7a of the retrieval conveyor 7 or stored by conveying from the transferring end portion 6a of the storage conveyor 6 to an available space on the storage area, and as another container storage/retrieval method, an individual retrieval method of retrieving just a specific container C among stacked containers, an individual storage method of storing just a specific container C among stacked containers positioned on the transferring end portion 6a of the storage conveyor 6, or a method of stacking and storing a container to be stored on another container of the same planar size stored inside the storage area, etc., may be implemented.

In an individual storage/retrieval method, the four gripping raising/lowering bodies 45a to 46b and the X-direction pair of lifting raising/lowering bodies 65A and 65B are lowered, with respect to stacked containers C that include a container to be stored or retrieved individually, close to a bottom surface level of the container to be stored or retrieved individually and thereafter made to perform the container lift-up operation described above. Consequently, stacked containers C in a state where the container to be stored or retrieved individually is positioned at the lowest end can be raised to the raising limit level, and therefore thereafter, the stacked containers C are conveyed horizontally to a position directly above a targeted lowering position (the transferring end portion 7a of the retrieval conveyor 7 or an available space on the storage area or a container of the same planar size stored in the storage area) and the stacked containers C are lowered to the targeted lowering position. Thereafter, the four gripping raising/lowering bodies 45a to 46b and the X-direction pair of lifting raising/lowering bodies 65A and 65B that are released laterally to the sides from the stacked containers C are not raised to the raising limit level but are made to perform an operation of lifting up, from among the lowered stacked containers C, all containers besides the container to be stored or retrieved individually that are stacked above the lowest-end container, which is the container to be stored or retrieved individually. Consequently, just the container to be stored or retrieved individually is left at the targeted lowering position and the storage/retrieval operation of the container to be stored or retrieved individually is completed. The containers C, which are not to be stored or retrieved individually and have been lifted up leaving the container to be stored or retrieved individually, may be conveyed to and lowered at the original location or a new location by the same procedures described above.

In lowering a single container C or stacked containers C to be stored or retrieved, which is or are positioned by the four gripping raising/lowering bodies 45a to 46b and supported by the X-direction pair of lifting raising/lowering bodies 65A and 65B, at a target location as described above, by controlling the raising/lowering drive means 57A and 57B so that after the container or containers C to be stored or retrieved is received and retained at the target location, the support units 67a and 67b are lowered slightly and each of the pin-shaped supporting implements 76a and 76b supporting the flange portion F1 or F2 of the container C to be stored or retrieved becomes slightly separated downward from the flange portion F1 or F2, excessive sliding contact between each of the flange portions F1 and F2 of the container or containers C to be stored or retrieved and the pin-shaped supporting implement 76a or 76b supporting it can be avoided when moving the four gripping raising/lowering bodies 45a to 46b and the lifting raising/lowering bodies 65A and 65B to separate outward from the container or containers C to be stored or retrieved.

However, with the configuration described above, the support units 67a and 67b are just supported by gravity at fixed positions with respect to the vertical rod-shaped main bodies 66 of the lifting raising/lowering bodies 65A and 65B and can move freely upward against gravity from the fixed positions, and thus even if the vertical rod-shaped main bodies 66 of the lifting raising/lowering bodies 65A and 65B are in a situation of stopping at positions further lowered from ideal positions as mentioned above, the support units 67a and 67b are supported by the container or containers C to be stored or retrieved via each of the pin-shaped supporting implements 76a and 76b that was positioned at an upper side of the flange portion F1 or F2 of the container C to be stored or retrieved and the vertical rod-shaped main bodies 66 of the lifting raising/lowering bodies 65A and 65B are simply lowered relative to the support units 67a and 67b so that each of the pin-shaped supporting implements 76a and 76b that was positioned at an upper side of the flange portion F1 or F2 of the container C to be stored or retrieved will not press down on the flange portion F1 or F2 from above.

With the present invention, the basically four gripping raising/lowering bodies 45a to 46b are not essential. For example, by widening the interval of each pair of pin-shaped supporting implements 76a or 76b positioned at symmetrical positions at both sides of the vertical center line of each of the two parallel side surfaces of the container C, the container C can be lifted and conveyed with good stability even without the four gripping raising/lowering bodies 45a to 46b. As a matter of course, it is possible to provide a configuration where four lifting raising/lowering bodies respectively corresponding to four side surfaces of the container C are installed to enable the container C to be lifted and conveyed with even better stability without the four gripping raising/lowering bodies 45a to 46b.

The container raising/lowering conveyance apparatus according to the present invention can be utilized effectively for stacked container storage/retrieval operations in a storage facility for stacked containers of various sizes.

What is claimed is:

1. A container raising/lowering conveyance apparatus, comprising:
   at least two lifting raising/lowering bodies, corresponding respectively to central positions in right/left width directions of two parallel side surfaces of an article-conveyance container with a right-angled parallelogram planar shape,
   the two lifting/raising lowering bodies being are supported by a supporting structure so as to be capable of being raised and lowered and capable of being moved closer to and away from each other,
   respective support units being attached to the two lifting raising/lowering bodies,
   the support units face the central positions in the right/left width directions of the respective two parallel side surfaces of the article-conveyance container,
   each support unit including pairs of pin-shaped supporting implements protruding toward the container side at symmetrical positions on both sides of a vertical center line passing through the central position in the right/left width directions of each of the two parallel side surfaces of the container, the pairs of pin-shaped supporting implements are arranged and supported at intervals in a vertical direction in each of the support units, and each of the pin-shaped supporting implements being capable of extending and retracting and being impelled into and held in a protruded position by a spring, and
   the pairs of pin-shaped supporting implements having a narrow interval therebetween and pairs of pin-shaped supporting implements having a broad interval therebetween being arranged alternately in the vertical direction.

2. The container raising/lowering conveyance apparatus as in claim 1, wherein each of the pairs of pin-shaped supporting implements having the broad interval therebetween is disposed at a central height of a vertical interval of the pairs of pin-shaped supporting implements having the narrow interval therebetween in a manner such that the pairs of pin-shaped supporting implements having the broad interval therebetween and the pairs of pin-shaped supporting implements having the narrow interval therebetween are overlapped in side view.

3. The container raising/lowering conveyance apparatus as in claim 1, wherein a plurality of support units are supported across a suitable interval in the vertical direction by each lifting raising/lowering body.

4. The container raising/lowering conveyance apparatus as in claim 1, wherein the respective lifting raising/lowering bodies are provided with vertical rod-shaped main bodies supported by the supporting structure so as to be capable of being raised and lowered, and capable of being moved closer to and away from each other, and each support unit is capable of being raised and lowered with respect to the corresponding vertical rod-shaped main body and is supported at a fixed height position of the vertical rod-shaped main body.

5. The container raising/lowering conveyance apparatus as in claim 4, wherein each of the support units includes a casing, distributedly supporting the pin-shaped supporting implements at both sides of the corresponding vertical rod-shaped main body and having the springs installed inside, and the vertical rod-shaped main body, a slide guide rail laid at a container-side surface of the vertical rod-shaped main body, and a slide block attached to the casing so as to fit with the slide guide rail are configured so as to be inserted in an inner side of the casing in side view.

6. The container raising/lowering conveyance apparatus as in claim 1, further comprising: four gripping raising/lowering bodies, each operable to grip one of four corners of the article-conveyance container, wherein the four gripping raising/lowering bodies can undergo raising and lowering motions and move freely horizontally in a horizontally oriented X direction parallel to the two parallel side surfaces of the container and in a horizontally oriented Y direction orthogonal to the horizontally oriented X direction, and the four gripping raising/lowering bodies respectively have fitting portions that fit the four corners of the container, and the support units are provided freely movably in the horizontally oriented X direction at central positions between the two gripping raising/lowering bodies positioned on both right and left sides of each of the two parallel side surfaces of the container.

* * * * *